US012431147B2

(12) United States Patent
Liang

(10) Patent No.: US 12,431,147 B2
(45) Date of Patent: Sep. 30, 2025

(54) SPEECH CODING METHOD AND APPARATUS, SPEECH DECODING METHOD AND APPARATUS, COMPUTER DEVICE, AND STORAGE MEDIUM

(71) Applicant: Tencent Technology (Shenzhen) Company Limited, Shenzhen (CN)

(72) Inventor: Junbin Liang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 211 days.

(21) Appl. No.: 18/124,496

(22) Filed: Mar. 21, 2023

(65) Prior Publication Data

US 2023/0238009 A1 Jul. 27, 2023

Related U.S. Application Data

(63) Continuation of application No. PCT/CN2022/093329, filed on May 17, 2022.

(30) Foreign Application Priority Data

Jun. 22, 2021 (CN) ......................... 202110693160.9

(51) Int. Cl.
*G10L 19/02* (2013.01)

(52) U.S. Cl.
CPC ................................ *G10L 19/0204* (2013.01)

(58) Field of Classification Search
CPC .... G10L 19/0204; G10L 21/038; G10L 19/16
See application file for complete search history.

(56) References Cited

U.S. PATENT DOCUMENTS 3,349,184 A 10/1967 Morgan
4,636,972 A * 1/1987 Boland .............. H03H 17/0213
708/321

(Continued)

FOREIGN PATENT DOCUMENTS

CN 1677491 A 10/2005
CN 1905373 A 1/2007

(Continued)

OTHER PUBLICATIONS

S. Sekimoto, and S. Saito, "Nonlinear frequency compression speech processing based on PARCOR analysis synthesis technique," Ann Bull Rilp, 14, pp. 65-72, 1980. (Year: 1980).*

(Continued)

*Primary Examiner* — Bhavesh M Mehta
*Assistant Examiner* — Philip H Lam
(74) *Attorney, Agent, or Firm* — Morgan, Lewis & Bockius LLP

(57) ABSTRACT

This application relates to a speech coding method performed by a computer device. The method includes: obtaining initial frequency bandwidth feature information corresponding to a speech signal; performing feature compression on initial feature information corresponding to a second band in the initial frequency bandwidth feature information to obtain target feature information corresponding to a compressed band, a frequency interval of the second band being greater than a frequency interval of the compressed band; obtaining, based on the target feature information corresponding to the compressed band, a compressed speech signal corresponding to the speech signal; and coding the compressed speech signal to obtain coded speech data corresponding to the speech signal, a target sampling rate corresponding to the compressed speech signal being less than a sampling rate corresponding to the speech signal.

17 Claims, 11 Drawing Sheets

(56) References Cited

U.S. PATENT DOCUMENTS

| | | | | |
|---|---|---|---|---|
| 5,960,390 | A * | 9/1999 | Ueno | G10L 19/025 704/E19.012 |
| 6,721,698 | B1 * | 4/2004 | Hariharan | G10L 15/02 704/203 |
| 9,679,576 | B2 | 6/2017 | Kawashima et al. | |
| 2002/0064284 | A1 | 5/2002 | Takagi et al. | |
| 2004/0264721 | A1 * | 12/2004 | Allegro | H04R 25/353 381/316 |
| 2006/0241938 | A1 * | 10/2006 | Hetherington | G10L 21/0364 704/E21.002 |
| 2006/0247922 | A1 * | 11/2006 | Hetherington | G10L 21/02 704/E21.002 |
| 2008/0140393 | A1 * | 6/2008 | Kim | G10L 19/0204 704/E19.014 |
| 2011/0249843 | A1 * | 10/2011 | Holmberg | H04R 25/353 381/98 |
| 2012/0134522 | A1 * | 5/2012 | Jenison | H04R 25/505 381/98 |
| 2013/0322671 | A1 * | 12/2013 | Alexander | H04R 25/40 381/316 |
| 2015/0154969 | A1 | 6/2015 | Craven et al. | |
| 2015/0294673 | A1 * | 10/2015 | Kawashima | G10L 19/032 704/206 |
| 2015/0302859 | A1 * | 10/2015 | Aguilar | G10L 19/002 704/211 |
| 2017/0133023 | A1 * | 5/2017 | Disch | G10L 19/24 |

FOREIGN PATENT DOCUMENTS

| | | | |
|---|---|---|---|
| CN | 101217038 | A | 7/2008 |
| CN | 101604527 | A | 12/2009 |
| CN | 102522092 | A | 6/2012 |
| CN | 104508740 | A | 4/2015 |
| CN | 104737227 | A | 6/2015 |
| CN | 107925388 | A | 4/2018 |
| CN | 110832582 | A | 2/2020 |
| CN | 111402908 | A | 7/2020 |
| EP | 2355094 | B1 | 4/2017 |
| JP | H 11202900 | A | 7/1999 |
| JP | 2000049620 | A | 2/2000 |
| JP | 2004289196 | A | 10/2004 |

OTHER PUBLICATIONS

Tencent Technology, ISR, PCT/CN2022/093329, Jul. 27, 2022, 5 pgs.

Tencent Technology, WO, PCT/CN2022/093329, Jul. 27, 2022, 5 pgs.

Tencent Technology, IPRP, PCT/CN2022/093329, Dec. 14, 2023, 6 pgs.

Tencent Technology, Extended European Search Report, EP Patent Application No. 22827252.2, Jul. 22, 2024, 7 pgs.

* cited by examiner (a) Signal before compression (b) Signal after compression (a) Frequency spectrum of the original high-sampling rate speech signal (b) Frequency spectrum of the high-sampling rate speech signal after extension

SPEECH CODING METHOD AND APPARATUS, SPEECH DECODING METHOD AND APPARATUS, COMPUTER DEVICE, AND STORAGE MEDIUM

CROSS-REFERENCE TO RELATED APPLICATION

This application is a continuation application of PCT Patent Application No. PCT/CN2022/093329, entitled "I SPEECH CODING METHOD AND APPARATUS, SPEECH DECODING METHOD AND APPARATUS, COMPUTER DEVICE, AND STORAGE MEDIUM" filed on May 17, 2022, which claims priority to Chinese Patent Application No. 2021106931609, entitled "SPEECH CODING METHOD AND APPARATUS, SPEECH DECODING METHOD AND APPARATUS, COMPUTER DEVICE, AND STORAGE MEDIUM" filed to the China Patent Office on Jun. 22, 2021, all of which are incorporated herein by reference in their entirety.

FIELD OF THE TECHNOLOGY

This application relates to the field of computer technologies, and in particular to a speech coding method and apparatus, a speech decoding method and apparatus, a computer device, a storage medium, and a computer program product.

BACKGROUND OF THE DISCLOSURE

With the development of a computer technology, a speech codec technology has emerged. The speech coding-decoding technology may be applied to speech storage and speech transmission.

In the conventional technology, a speech acquisition device is required to be used in combination with a speech coder, and a sampling rate of the speech acquisition device is required to be within a sampling rate range supported by the speech coder. In this way, a speech signal acquired by the speech acquisition device may be coded by the speech coder for storage or transmission. In addition, playing of the speech signal also depends on a speech decoder. The speech coder can only decode and play the speech signal having a sampling rate within the sampling rate range supported by the speech coder. Therefore, only the speech signal having the sampling rate within the sampling rate range supported by the speech coder can be played.

However, in the traditional method, acquisition of the speech signal is limited by the sampling rate supported by the existing speech coder, and the playing of the speech signal is also limited by the sampling rate supported by the existing speech decoder. Therefore, the limitations are great.

SUMMARY

According to various embodiments of this application, a speech coding method and apparatus, a speech decoding method and apparatus, a computer device, a storage medium, and a computer program product are provided.

A speech coding method is performed by a computer device acting as a speech transmitting end. The method includes:

obtaining initial frequency bandwidth feature information corresponding to a speech signal;

obtaining, based on initial feature information corresponding to a first band in the initial frequency bandwidth feature information, target feature information corresponding to the first band;

performing feature compression on initial feature information corresponding to a second band in the initial frequency bandwidth feature information to obtain target feature information corresponding to a compressed band, a frequency of the first band being less than a frequency of the second band, and a frequency interval of the second band being greater than a frequency interval of the compressed band;

obtaining, based on the target feature information corresponding to the first band and the target feature information corresponding to the compressed band, intermediate frequency bandwidth feature information, and obtaining, based on the intermediate frequency bandwidth feature information, a compressed speech signal corresponding to the speech signal; and coding the compressed speech signal through a speech coding module to obtain coded speech data corresponding to the speech signal, a target sampling rate corresponding to the compressed speech signal being less than or equal to a supported sampling rate corresponding to the speech coding module, and the target sampling rate being less than a sampling rate corresponding to the speech signal.

A speech coding apparatus includes:

a frequency bandwidth feature information obtaining module, configured to obtain initial frequency bandwidth feature information corresponding to a speech signal;

a first target feature information determining module, configured to obtain, based on initial feature information corresponding to a first band in the initial frequency bandwidth feature information, target feature information corresponding to the first band;

a second target feature information determining module, configured to perform feature compression on initial feature information corresponding to a second band in the initial frequency bandwidth feature information to obtain target feature information corresponding to a compressed band, a frequency of the first band being less than a frequency of the second band, and a frequency interval of the second band being greater than a frequency interval of the compressed band;

a compressed speech signal generating module, configured to obtain, based on the target feature information corresponding to the first band and the target feature information corresponding to the compressed band, intermediate frequency bandwidth feature information, and obtain, based on the intermediate frequency bandwidth feature information, a compressed speech signal corresponding to the speech signal; and a speech signal coding module, configured to code the compressed speech signal through a speech coding module to obtain coded speech data corresponding to the speech signal, a target sampling rate corresponding to the compressed speech signal being less than or equal to a supported sampling rate corresponding to the speech coding module, and the target sampling rate being less than a sampling rate corresponding to the speech signal.

A computer device includes a memory and one or more processors. The memory stores computer-readable instructions. The computer-readable instructions, when executed by the one or more processors, enable the one or more processors to perform the operations of the foregoing speech coding method.

One or more non-volatile computer-readable storage media store computer-readable instructions. The computer-readable instructions, when executed by one or more processors, enable the one or more processors to perform the operations of the foregoing speech coding method.

A computer program product or a computer program includes computer-readable instructions. The computer-readable instructions are stored in a computer-readable storage medium. One or more processors of a computer device read the computer-readable instructions from the computer-readable storage medium. The one or more processors execute the computer-readable instructions to enable the computer device to perform the operations of the foregoing speech coding method.

A speech decoding method is performed by a speech receiving end. The method includes:

obtaining coded speech data, the coded speech data being obtained by performing speech compression processing on a speech signal;

decoding the coded speech data through a speech decoding module to obtain a decoded speech signal, a target sampling rate corresponding to the decoded speech signal being less than or equal to a supported sampling rate corresponding to the speech decoding module;

generating target frequency bandwidth feature information corresponding to the decoded speech signal, and obtaining, based on target feature information corresponding to a first band in the target frequency bandwidth feature information, extended feature information corresponding to the first band;

performing feature extension on target feature information corresponding to a compressed band in the target frequency bandwidth feature information to obtain extended feature information corresponding to a second band, a frequency of the first band being less than a frequency of the compressed band, and a frequency interval of the compressed band being less than a frequency interval of the second band; and obtaining, based on the extended feature information corresponding to the first band and the extended feature information corresponding to the second band, extended frequency bandwidth feature information, and obtaining, based on the extended frequency bandwidth feature information, a target speech signal corresponding to the speech signal, a sampling rate of the target speech signal being greater than the target sampling rate, and the target speech signal being used for playing.

A speech decoding apparatus includes:

a speech data obtaining module, configured to obtain coded speech data, the coded speech data being obtained by performing speech compression processing on a speech signal;

a speech signal decoding module, configured to decode the coded speech data through a speech decoding module to obtain a decoded speech signal, a target sampling rate corresponding to the decoded speech signal being less than or equal to a supported sampling rate corresponding to the speech decoding module;

a first extended feature information determining module, configured to generate target frequency bandwidth feature information corresponding to the decoded speech signal, and obtain, based on target feature information corresponding to a first band in the target frequency bandwidth feature information, extended feature information corresponding to the first band;

a second extended feature information determining module, configured to perform feature extension on target feature information corresponding to a compressed band in the target frequency bandwidth feature information to obtain extended feature information corresponding to a second band, a frequency of the first band being less than a frequency of the compressed band, and a frequency interval of the compressed band being less than a frequency interval of the second band; and a target speech signal determining module, configured to obtain, based on the extended feature information corresponding to the first band and the extended feature information corresponding to the second band, extended frequency bandwidth feature information, and obtain, based on the extended frequency bandwidth feature information, a target speech signal corresponding to the speech signal, a sampling rate of the target speech signal being greater than the target sampling rate, and the target speech signal being used for playing.

A computer device includes a memory and one or more processors. The memory stores computer-readable instructions. The computer-readable instructions, when executed by the one or more processors, enable the one or more processors to perform the operations of the foregoing speech decoding method.

One or more non-transitory computer-readable storage media store computer-readable instructions. The computer-readable instructions, when executed by one or more processors, enable the one or more processors to perform the operations of the foregoing speech decoding method.

A computer program product or a computer program includes computer-readable instructions. The computer-readable instructions are stored in a computer-readable storage medium. One or more processors of a computer device read the computer-readable instructions from the computer-readable storage medium. The one or more processors execute the computer-readable instructions to enable the computer device to perform the operations of the foregoing speech decoding method.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that specific embodiments described herein are merely illustrative of this application and are not intended to be limiting thereof.

Figure 1:
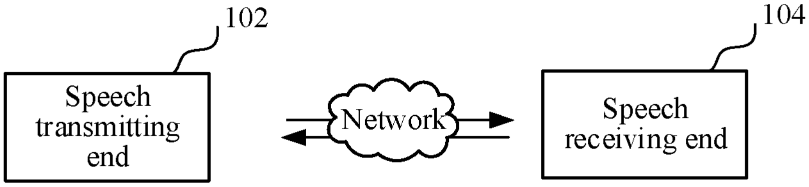
FIG. 1 is an application environment diagram of a speech coding method and a speech decoding method in one embodiment.

A speech coding method and a speech decoding method provided in this application may be applied to an application environment as shown in FIG. 1. A speech transmitting end 102 communicates with a speech receiving end 104 through a network. The speech transmitting end, which may also be referred to as a speech encoder side, is mainly used for speech coding. The speech receiving end, which may also be referred to as a speech decoder side, is mainly used for speech decoding. The speech transmitting end 102 and the speech receiving end 104 may be terminals or servers. The terminals may be, but are not limited to, various desktop computers, notebook computers, smart phones, tablet computers, Internet of Things devices, and portable wearable devices. The Internet of Things devices may be smart speakers, smart televisions, smart air conditioners, smart vehicle-mounted devices, or the like. The portable wearable devices may be smart watches, smart bracelets, head-mounted devices, or the like. The server 104 may be implemented as a stand-alone server or as a server cluster composed of a plurality of servers or a cloud server.

Specifically, the speech transmitting end obtains initial frequency bandwidth feature information corresponding to a speech signal. The speech transmitting end may obtain, based on initial feature information corresponding to a first band in the initial frequency bandwidth feature information, target feature information corresponding to the first band, and perform feature compression on initial feature information corresponding to a second band in the initial frequency bandwidth feature information to obtain target feature information corresponding to a compressed band. A frequency of the first band is less than a frequency of the second band, and a frequency interval of the second band is greater than a frequency interval of the compressed band. The speech transmitting end obtains, based on the target feature information corresponding to the first band and the target feature information corresponding to the compressed band, intermediate frequency bandwidth feature information, obtains, based on the intermediate frequency bandwidth feature information, a compressed speech signal corresponding to the speech signal, and codes the compressed speech signal through a speech coding module to obtain coded speech data corresponding to the speech signal. A target sampling rate corresponding to the compressed speech signal is less than or equal to a supported sampling rate corresponding to the speech coding module, and the target sampling rate is less than a sampling rate corresponding to the speech signal. The speech transmitting end may transmit the coded speech data to a speech receiving end such that the speech receiving end performs speech restoration processing on the coded speech data to obtain a target speech signal corresponding to the speech signal, and plays the target speech signal. The speech transmitting end may also store the coded speech data locally. When playing is required, the speech transmitting end performs speech restoration processing on the coded speech data to obtain a target speech signal corresponding to the speech signal, and plays the target speech signal.

In the foregoing speech coding method, before speech coding, band feature information may be compressed for a speech signal having any sampling rate to reduce the sampling rate of the speech signal to a sampling rate supported by a speech coder. A target sampling rate corresponding to a compressed speech signal obtained through compression is less than the sampling rate corresponding to the speech signal. A compressed speech signal having a low sampling rate is obtained through compression. Since the sampling rate of the compressed speech signal is less than or equal to the sampling rate supported by the speech coder, the compressed speech signal may be successfully coded by the speech coder. Finally, the coded speech data obtained through coding may be transmitted to the speech decoder side.

The speech receiving end obtains coded speech data, and decodes the coded speech data through a speech decoding module to obtain a decoded speech signal. The coded speech data may be transmitted by the speech transmitting end, and may also be obtained by performing speech compression processing on the speech signal locally by the speech receiving end. The speech receiving end generates target frequency bandwidth feature information corresponding to the decoded speech signal, obtains, based on the target feature information corresponding to the first band in the target frequency bandwidth feature information corresponding to the decoded speech signal, extended feature information corresponding to the first band, and performs feature extension on the target feature information corresponding to the compressed band in the target frequency bandwidth feature information to obtain extended feature information corresponding to the second band. A frequency of the first band is less than a frequency of the compressed band, and a frequency interval of the compressed band is less than a frequency interval of the second band. The speech receiving end obtains, based on the extended feature information corresponding to the first band and the extended feature information corresponding to the second band, extended frequency bandwidth feature information, and obtains, based on the extended frequency bandwidth feature information, a target speech signal corresponding to the speech signal. A sampling rate of the target speech signal is greater than a target sampling rate corresponding to the decoded speech signal. Finally, the speech receiving end plays the target speech signal.

In the foregoing speech decoding method, after coded speech data obtained through speech compression processing is obtained, the coded speech data may be decoded to obtain a decoded speech signal. Through the extension of band feature information, the sampling rate of the decoded speech signal may be increased to obtain a target speech signal for playing. The playing of a speech signal is not subject to the sampling rate supported by the speech decoder. During speech playing, a high-sampling rate speech signal with more abundant information may also be played.

It will be appreciated that in the transmission of coded speech data, the coded speech data may be routed to a server. The routed server may be implemented as a stand-alone server or as a server cluster composed of a plurality of servers or a cloud server. The speech receiving end and the speech transmitting end may be converted with each other. That is, the speech receiving end may also serve as the speech transmitting end, and the speech transmitting end may also serve as the speech receiving end.

Figure 2:
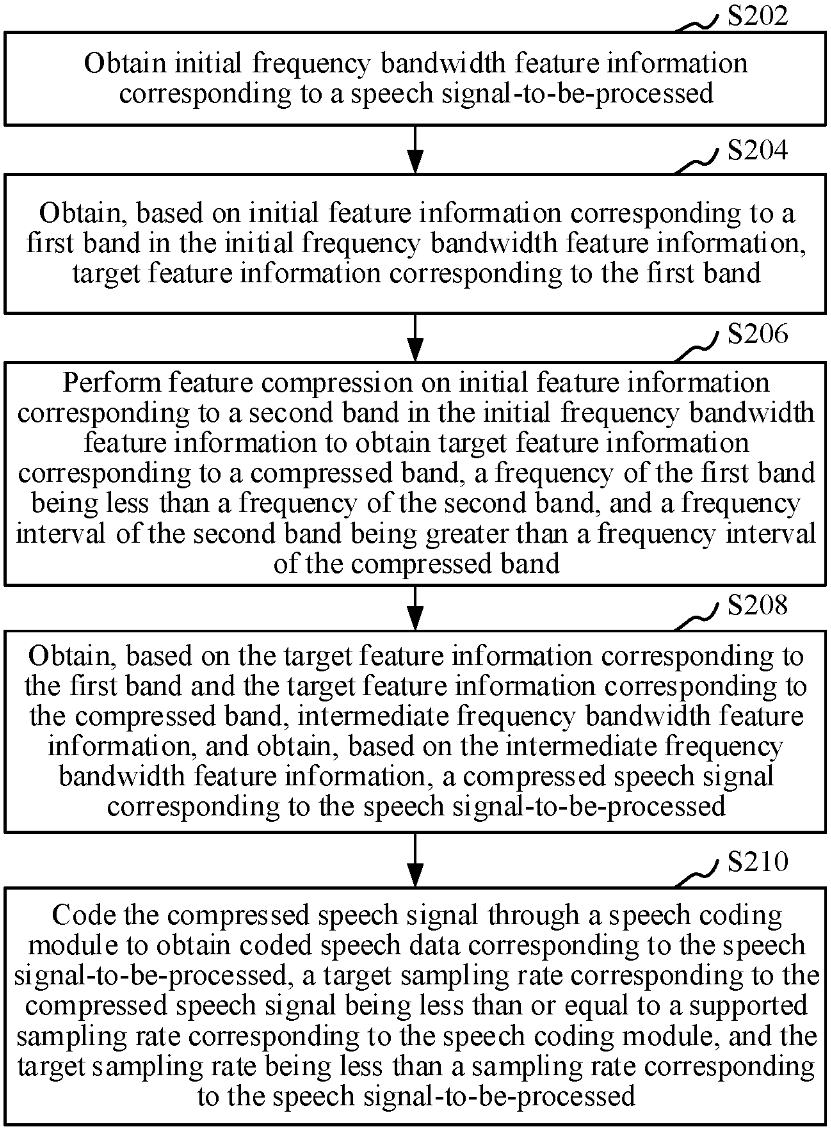
FIG. 2 is a schematic flowchart of a speech coding method in one embodiment.

In one embodiment, as shown in FIG. 2, a speech coding method is provided. The method is illustrated by using the speech transmitting end in FIG. 1 as an example, and includes the following steps:

Step S202: Obtain initial frequency bandwidth feature information corresponding to a speech signal.

The speech signal refers to a speech signal acquired by a speech acquisition device. The speech signal may be a speech signal acquired by the speech acquisition device in real time. The speech transmitting end may perform frequency bandwidth compression and coding processing on a newly acquired speech signal in real time to obtain coded speech data. The speech signal may also be a speech signal acquired historically by the speech acquisition device. The speech transmitting end may obtain the speech signal acquired historically from a database as a speech signal, and perform frequency bandwidth compression and coding processing on the speech signal to obtain coded speech data. The speech transmitting end may store the coded speech data, and decode and play the coded speech data when playing is required. The speech transmitting end may also transmit the coded speech signal to the speech receiving end. The speech receiving end decodes and plays the coded speech data. The speech signal is a time domain signal and may reflect the change of the speech signal with time.

The frequency bandwidth compression may reduce the sampling rate of the speech signal while keeping speech content intelligible. The frequency bandwidth compression refers to compressing a large-frequency bandwidth speech signal into a small-frequency bandwidth speech signal. The small-frequency bandwidth speech signal and the large-frequency bandwidth speech signal have the same low-frequency information therebetween.

The initial frequency bandwidth feature information refers to feature information of the speech signal in frequency domain. The feature information of the speech signal in frequency domain includes an amplitude and a phase of a plurality of frequency points within a frequency bandwidth (that is, frequency bandwidth). A frequency point represents a specific frequency. According to Shannon's theorem, it can be seen that the sampling rate of a speech signal is twice the band of the speech signal. For example, if the sampling rate of a speech signal is 48 khz, the band of the speech signal is 24 khz, specifically 0-24 khz. If the sampling rate of a speech signal is 16 khz, the band of the speech signal is 8 khz, specifically 0-8 khz.

Specifically, the speech transmitting end may take a speech signal locally acquired by the speech acquisition device as a speech signal, and locally extract a frequency domain feature of the speech signal as initial frequency bandwidth feature information corresponding to the speech signal. The speech transmitting end may convert a time domain signal into a frequency domain signal by using a time domain-frequency domain conversion algorithm, so as to extract frequency domain features of the speech signal, for example, a self-defined time domain-frequency domain conversion algorithm, a Laplace transform algorithm, a Z transform algorithm, a Fourier transform algorithm, or the like.

Step S204: Obtain, based on initial feature information corresponding to a first band in the initial frequency bandwidth feature information, target feature information corresponding to the first band.

A band is a frequency interval composed of some frequencies in a frequency bandwidth. A frequency bandwidth may be composed of at least one band. An initial frequency bandwidth corresponding to the speech signal includes a first band and a second band. A frequency of the first band is less than a frequency of the second band. The speech transmitting end may divide the initial frequency bandwidth feature information into initial feature information corresponding to the first band and initial feature information corresponding to the second band. That is, the initial frequency bandwidth feature information may be divided into initial feature information corresponding to a low band and initial feature information corresponding to a high band. The initial feature information corresponding to the low band mainly determines content information of a speech, for example, a specific semantic content "off-duty time". The initial feature information corresponding to the high band mainly determines the texture of the speech, for example, a hoarse and deep voice.

The initial feature information refers to feature information corresponding to each frequency before frequency bandwidth compression. The target feature information refers to feature information corresponding to each frequency after frequency bandwidth compression.

Specifically, if the sampling rate of the speech signal is higher than the sampling rate supported by the speech coder, the speech signal cannot be coded directly by the speech coder. Therefore, frequency bandwidth compression of the speech signal is required to reduce the sampling rate of the speech signal. During the frequency bandwidth compression, besides reducing the sampling rate of the speech signal, it is further required to ensure that the semantic content remains unchanged and naturally intelligible. Since the semantic content of the speech depends on low-frequency information in the speech signal, the speech transmitting end may divide the initial frequency bandwidth feature information into the initial feature information corresponding to the first band and the initial feature information corresponding to the second band. The initial feature information corresponding to the first band is low-frequency information in the speech signal. The initial feature information corresponding to the second band is high-frequency information in the speech signal. In order to ensure the intelligibility and readability of the speech, the speech transmitting end may remain the low-frequency information unchanged and compress the high-frequency information during the frequency bandwidth compression. Therefore, the speech transmitting end may obtain, based on the initial feature information corresponding to the first band in the initial frequency bandwidth feature information, target feature information corresponding to the first band, and take the initial feature information corresponding to the first band in the initial frequency bandwidth feature information as target feature information corresponding to the first band in the intermediate frequency bandwidth feature information. That is, the low-frequency information remains unchanged before and after the frequency bandwidth compression, and the low-frequency information is consistent.

In one embodiment, the speech transmitting end may divide, based on a preset frequency, the initial frequency bandwidth into the first band and the second band. The preset frequency may be set based on expert knowledge. For example, the preset frequency is set to 6 khz. If the sampling rate of the speech signal is 48 khz, the initial frequency bandwidth corresponding to the speech signal is 0-24 khz, the first band is 0-6 khz, and the second band is 6-24 khz.

Step S206: Perform feature compression on initial feature information corresponding to a second band in the initial frequency bandwidth feature information to obtain target feature information corresponding to a compressed band. A frequency of the first band is less than a frequency of the second band, and a frequency interval of the second band is greater than a frequency interval of the compressed band.

The feature compression is to compress feature information corresponding to a large band into feature information corresponding to a small band, and to extract concentrated feature information. The second band represents the large band, and the compressed band represents the small band. That is, the frequency interval of the second band is greater than the frequency interval of the compressed band. That is, the length of the second band is greater than the length of the compressed band. It will be appreciated that a minimum frequency in the second band may be the same as a minimum frequency in the compressed band in view of the seamless connection of the first band and the compressed band. At this moment, a maximum frequency in the second band is obviously greater than a maximum frequency in the compressed band. For example, if the first band is 0-6 khz and the second band is 6-24 khz, then the compressed band may be 6-8 khz, 6-16 khz, or the like. The feature compression may also be considered to compress the feature information corresponding to the high band into the feature information corresponding to the low band.

Specifically, when performing the frequency bandwidth compression, the speech transmitting end mainly compresses the high-frequency information in the speech signal. The speech transmitting end may perform feature compression on the initial feature information corresponding to the second band in the initial frequency bandwidth feature information to obtain the target feature information corresponding to the compressed band.

In one embodiment, the initial frequency bandwidth feature information includes amplitudes and phases corresponding to a plurality of initial speech frequency points. When performing feature compression, the speech transmitting end may compress both the amplitude and phase of the initial speech frequency point corresponding to the second band in the initial frequency bandwidth feature information to obtain an amplitude and phase of a target speech frequency point corresponding to the compressed band, and obtain, based on the amplitude and phase of the target speech frequency point, the target feature information corresponding to the compressed band. The compression of the amplitude or phase may be calculating an mean of the amplitude or phase of the initial speech frequency point corresponding to the second band as the amplitude or phase of the target speech frequency point corresponding to the compressed band, or calculating a weighted mean of the amplitude or phase of the initial speech frequency point corresponding to the second band as the amplitude or phase of the target speech frequency point corresponding to the compressed band, or may be other compression methods. The compression of the amplitude or phase may further include a segmented compression in addition to a global compression.

Further, in order to reduce a difference between the target feature information and the initial feature information, the speech transmitting end may only compress the amplitude of the initial speech frequency point corresponding to the second band in the initial frequency bandwidth feature information to obtain the amplitude of the target speech frequency point corresponding to the compressed band, search for, in the initial speech frequency point corresponding to the second band, the initial speech frequency point having a consistent frequency with the target speech frequency point corresponding to the compressed band as an intermediate speech frequency point, take a phase corresponding to the intermediate speech frequency point as the phase of the target speech frequency point, and obtain, based on the amplitude and phase of the target speech frequency point, the target feature information corresponding to the compressed band. For example, if the second band is 6-24 khz and the compressed band is 6-8 khz, then the phase of the initial speech frequency point corresponding to 6-8 khz in the second band may be taken as the phase of each target speech frequency point corresponding to 6-8 khz in the compressed band.

Step S208: Obtain, based on the target feature information corresponding to the first band and the target feature information corresponding to the compressed band, intermediate frequency bandwidth feature information, and obtain, based on the intermediate frequency bandwidth feature information, a compressed speech signal corresponding to the speech signal.

The intermediate frequency bandwidth feature information refers to feature information obtained after performing frequency bandwidth compression on the initial frequency bandwidth feature information. The compressed speech signal refers to a speech signal obtained after performing frequency bandwidth compression on the speech signal. The frequency bandwidth compression may reduce the sampling rate of the speech signal while keeping speech content intelligible. It will be appreciated that the sampling rate of the speech signal is greater than the corresponding sampling rate of the compressed speech signal.

Specifically, the speech transmitting end may obtain, based on the target feature information corresponding to the first band and the target feature information corresponding to the compressed band, the intermediate frequency bandwidth feature information. The intermediate frequency bandwidth feature information is a frequency domain signal. After obtaining the intermediate frequency bandwidth feature information, the speech transmitting end may convert the frequency domain signal into a time domain signal so as to obtain the compressed speech signal. The speech transmitting end may convert the frequency domain signal into the time domain signal by using a frequency domain-time domain conversion algorithm, for example, a self-defined frequency domain-time domain conversion algorithm, an inverse Laplace transform algorithm, an inverse Z transform algorithm, an inverse Fourier transform algorithm, or the like.

For example, the sampling rate of the speech signal is 48 khz, and the initial frequency bandwidth is 0-24 khz. The speech transmitting end may obtain initial feature information corresponding to 0-6 khz from the initial frequency bandwidth feature information, and directly take the initial feature information corresponding to 0-6 khz as target feature information corresponding to 0-6 khz. The speech transmitting end may obtain initial feature information corresponding to 6-24 khz from the initial frequency bandwidth feature information, and compress the initial feature information corresponding to 6-24 khz into target feature information corresponding to 6-8 khz. The speech transmitting end may generate, based on the target feature information corresponding to 0-8 khz, the compressed speech signal. The target sampling rate corresponding to the compressed speech signal is 16 khz.

It will be appreciated that the sampling rate of the speech signal may be higher than the sampling rate supported by the speech coder. Then the frequency bandwidth compression performed by the speech transmitting end on the speech signal may be compressing the speech signal having a high sampling rate into the sampling rate supported by the speech coder. Thus, the speech coder may successfully code the speech signal. Certainly, the sampling rate of the speech signal may also be equal to or less than the sampling rate supported by the speech coder. Then the frequency bandwidth compression performed by the speech transmitting end on the speech signal may be compressing the speech signal having a normal sampling rate into a speech signal having a lower sampling rate. Thus, the amount of calculation when the speech coder performs coding processing is reduced, and the amount of data transmission is reduced, thereby quickly transmitting the speech signal to the speech receiving end through the network.

In one embodiment, a frequency bandwidth corresponding to the intermediate frequency bandwidth feature information and a frequency bandwidth corresponding to the initial frequency bandwidth feature information may be the same or different. When the frequency bandwidth corresponding to the intermediate frequency bandwidth feature information is the same as the frequency bandwidth corresponding to the initial frequency bandwidth feature information, in the intermediate frequency bandwidth feature information, specific feature information exists between the first band and the compressed band, and feature information corresponding to each frequency greater than the compressed band is zero. For example, the initial frequency bandwidth feature information includes amplitudes and phases of a plurality of frequency points on 0-24 khz, and the intermediate frequency bandwidth feature information includes amplitudes and phases of a plurality of frequency points on 0-24 khz. The first band is 0-6 khz, the second band is 8-24 khz, and the compressed band is 6-8 khz. In the initial frequency bandwidth feature information, each frequency point on 0-24 khz has the corresponding amplitude and phase. In the intermediate frequency bandwidth feature information, each frequency point on 0-8 khz has the corresponding amplitude and phase, and each frequency point on 8-24 khz has the corresponding amplitude and phase of zero. If the frequency bandwidth corresponding to the intermediate frequency bandwidth feature information is the same as the frequency bandwidth corresponding to the initial frequency bandwidth feature information, the speech transmitting end is required to first convert the intermediate frequency bandwidth feature information into a time domain signal, and then perform down-sampling processing on the time domain signal to obtain the compressed speech signal.

When the frequency bandwidth corresponding to the intermediate frequency bandwidth feature information is different from the frequency bandwidth corresponding to the initial frequency bandwidth feature information, the frequency bandwidth corresponding to the intermediate frequency bandwidth feature information is composed of the first band and the compressed band, and the frequency bandwidth corresponding to the initial frequency bandwidth feature information is composed of the first band and the second band. For example, the initial frequency bandwidth feature information includes amplitudes and phases of a plurality of frequency points on 0-24 khz, and the intermediate frequency bandwidth feature information includes amplitudes and phases of a plurality of frequency points on 0-8 khz. The first band is 0-6 khz, the second band is 8-24 khz, and the compressed band is 6-8 khz. In the initial frequency bandwidth feature information, each frequency point on 0-24 khz has the corresponding amplitude and phase. In the intermediate frequency bandwidth feature information, each frequency point on 0-8 khz has the corresponding amplitude and phase. If the frequency bandwidth corresponding to the intermediate frequency bandwidth feature information is different from the frequency bandwidth corresponding to the initial frequency bandwidth feature information, the speech transmitting end may directly convert the intermediate frequency bandwidth feature information into a time domain signal. That is, the compressed speech signal may be obtained.

Step S210: Code the compressed speech signal through a speech coding module to obtain coded speech data corresponding to the speech signal. A target sampling rate corresponding to the compressed speech signal is less than or equal to a supported sampling rate corresponding to the speech coding module, and the target sampling rate is less than a sampling rate corresponding to the speech signal.

The speech coding module is a module for coding a speech signal. The speech coding module may be either hardware or software. The supported sampling rate corresponding to the speech coding module refers to a maximum sampling rate supported by the speech coding module, that is, an upper sampling rate limit. It will be appreciated that if the supported sampling rate corresponding to the speech coding module is 16 khz, the speech coding module may code a speech signal having a sampling rate less than or equal to 16 khz.

Specifically, by performing frequency bandwidth compression on the speech signal, the speech transmitting end may compress the speech signal into the compressed speech signal, such that the sampling rate of the compressed speech signal meets the sampling rate requirement of the speech coding module. The speech coding module supports processing of a speech signal having a sampling rate less than or equal to the upper sampling rate limit. The speech transmitting end may code the compressed speech signal through the speech coding module to obtain coded speech data corresponding to the speech signal. The coded speech data is bitstream data. If the coded speech data is only stored locally without network transmission, the speech transmitting end may perform speech coding on the compressed speech signal through the speech coding module to obtain the coded speech data. If the coded speech data is required to be further transmitted to the speech receiving end, the speech transmitting end may perform speech coding on the compressed speech signal through the speech coding module to obtain first speech data, and perform channel coding on the first speech data to obtain the coded speech data.

For example, in a speech chat scenario, friends may perform a speech chat on instant messaging applications of terminals. Users may transmit speech messages to friends on session interfaces in instant messaging applications. When friend A transmits a speech message to friend B, a terminal corresponding to friend A is a speech transmitting end, and a terminal corresponding to friend B is a speech receiving end. The speech transmitting end may obtain a trigger operation of friend A acting on a speech acquisition control on a session interface to acquire a speech signal, and obtain a speech signal through the speech signal of friend A acquired by a microphone. When a speech message is acquired by using a high-quality microphone, an initial sampling rate corresponding to the speech signal may be 48 khz. The speech signal has a better sound quality and has an ultra-wide frequency bandwidth, specifically being 0-24 khz. The speech transmitting end performs Fourier transform processing on the speech signal to obtain initial frequency bandwidth feature information corresponding to the speech signal. The initial frequency bandwidth feature information includes frequency domain information in the range of 0-24 khz. After performing non-linear frequency bandwidth compression on the frequency domain information of 0-24 khz, the speech transmitting end collects the frequency domain information of 0-24 khz onto 0-8 khz. Specifically, the initial feature information corresponding to 0-6 khz in the initial frequency bandwidth feature information may remain unchanged, and the initial feature information corresponding to 6-24 khz may be compressed onto 6-8 khz. The speech transmitting end generates, based on the frequency domain information of 0-8 khz obtained after non-linear frequency bandwidth compression, a compressed speech signal. A target sampling rate corresponding to the compressed speech signal is 16 khz. Then, the speech transmitting end may code the compressed speech signal through a conventional speech coder supporting 16 khz to obtain coded speech data, and transmit the coded speech data to the speech receiving end. A sampling rate corresponding to the coded speech data is consistent with the target sampling rate. After receiving the coded speech data, the speech receiving end may obtain the target speech signal through decoding processing and non-linear frequency bandwidth extension processing. The sampling rate of the target speech signal is consistent with the initial sampling rate. The speech receiving end may obtain a trigger operation of friend B acting on the speech message on the session interface to play the speech signal, and play the target speech signal having a high sampling rate through a loudspeaker.

In a recording scenario, when a terminal acquires a recording operation triggered by a user, the terminal may acquire a speech signal from the user through a microphone to obtain a speech signal. The terminal performs Fourier transform processing on the speech signal to obtain initial frequency bandwidth feature information corresponding to the speech signal. The initial frequency bandwidth feature information includes frequency domain information in the range of 0-24 khz. After performing non-linear frequency bandwidth compression on the frequency domain information of 0-24 khz, the terminal collects the frequency domain information of 0-24 khz onto 0-8 khz. Specifically, the initial feature information corresponding to 0-6 khz in the initial frequency bandwidth feature information may remain unchanged, and the initial feature information corresponding to 6-24 khz may be compressed onto 6-8 khz. The terminal generates, based on the frequency domain information of 0-8 khz obtained after non-linear frequency bandwidth compression, a compressed speech signal. A target sampling rate corresponding to the compressed speech signal is 16 khz. Then, the terminal may code the compressed speech signal through a conventional speech coder supporting 16 khz to obtain coded speech data, and store the coded speech data. When the terminal obtains a recording and playing operation triggered by the user, the terminal may perform speech restoration processing on the coded speech data to obtain a target speech signal and play the target speech signal.

In one embodiment, the coded speech data may carry compression identification information. The compression identification information is used for identifying band mapping information between the second band and the compressed band. Then, when performing speech restoration processing, the speech transmitting end or the speech receiving end may perform, based on the compression identification information, speech restoration processing on the coded speech data to obtain the target speech signal.

In one embodiment, the maximum frequency in the compressed band may be determined based on the supported sampling rate corresponding to the speech coding module at the speech transmitting end. For example, the supported sampling rate corresponding to the speech coding module is 16 khz. When the sampling rate of the speech signal is 16 khz, the corresponding frequency bandwidth is 0-8 khz, and a maximum frequency value in the compressed band may be 8 khz. Certainly, the maximum frequency value in the compressed band may also be less than 8 khz. Even if the maximum frequency value in the compressed band is less than 8 khz, the speech coding module having the supported sampling rate of 16 khz may also code the corresponding compressed speech signal. The maximum frequency in the compressed band may also be a default frequency. The default frequency may be determined based on corresponding supported sampling rates of various existing speech coding modules. For example, a minimum supported sampling rate among the supported sampling rates corresponding to various known speech coding modules is 16 khz, and the default frequency may be set to 8 khz.

In the foregoing speech coding method, initial frequency bandwidth feature information corresponding to a speech signal is obtained. Based on initial feature information corresponding to a first band in the initial frequency bandwidth feature information, target feature information corresponding to the first band is obtained. Feature compression is performed on initial feature information corresponding to a second band in the initial frequency bandwidth feature information to obtain target feature information corresponding to a compressed band. A frequency of the first band is less than a frequency of the second band, and a frequency interval of the second band is greater than a frequency interval of the compressed band. Based on the target feature information corresponding to the first band and the target feature information corresponding to the compressed band, intermediate frequency bandwidth feature information is obtained. Based on the intermediate frequency bandwidth feature information, a compressed speech signal corresponding to the speech signal is obtained. The compressed speech signal is coded through a speech coding module to obtain coded speech data corresponding to the speech signal. A target sampling rate corresponding to the compressed speech signal is less than or equal to a supported sampling rate corresponding to the speech coding module. In this way, before speech coding, band feature information may be compressed for a speech signal having any sampling rate to reduce the sampling rate of the speech signal to a sampling rate supported by a speech coder. A target sampling rate corresponding to a compressed speech signal obtained through compression is less than the sampling rate corresponding to the speech signal. A compressed speech signal having a low sampling rate is obtained through compression. Since the sampling rate of the compressed speech signal is less than or equal to the sampling rate supported by the speech coder, the compressed speech signal may be successfully coded by the speech coder. Finally, the coded speech data obtained through coding may be transmitted to a speech receiving end.

In one embodiment, the operation of obtaining initial frequency bandwidth feature information corresponding to a speech signal includes:

obtaining a speech signal acquired by a speech acquisition device; and performing Fourier transform processing on the speech signal to obtain the initial frequency bandwidth feature information, where the initial frequency bandwidth feature information includes initial amplitudes and initial phases corresponding to a plurality of initial speech frequency points.

The speech acquisition device refers to a device for acquiring speech, for example, a microphone. The Fourier transform processing refers to performing Fourier transform on the speech signal, and converting a time domain signal into a frequency domain signal. The frequency domain signal may reflect feature information of the speech signal in frequency domain. The initial frequency bandwidth feature information is the frequency domain signal. The initial speech frequency point refers to a frequency point in the initial frequency bandwidth feature information corresponding to the speech signal.

Specifically, the speech transmitting end may obtain a speech signal acquired by the speech acquisition device, perform Fourier transform processing on the speech signal, convert a time domain signal into a frequency domain signal, extract feature information of the speech signal in frequency domain, and obtain initial frequency bandwidth feature information. The initial frequency bandwidth feature information is composed of initial amplitudes and initial phases corresponding to a plurality of initial speech frequency points respectively. The phase of a frequency point determines the smoothness of a speech, the amplitude of a low-frequency frequency point determines a specific semantic content of the speech, and the amplitude of a high-frequency frequency point determines the texture of the speech. A frequency range composed of all the initial speech frequency points is an initial frequency bandwidth corresponding to the speech signal.

In one embodiment, the speech signal is subjected to fast Fourier transform to obtain N initial speech frequency points. Typically, N is an integer power of 2. The N initial speech frequency points are uniformly distributed. For example, if N is 1024 and the initial frequency bandwidth corresponding to the speech signal is 24 khz, the resolution of the initial speech frequency point is 24 k/1024=23.4375. That is, there is one initial speech frequency point at an interval of 23.4375 kz. It will be appreciated that in order to guarantee a higher resolution, different numbers of speech frequency points may be obtained by performing fast Fourier transform on speech signals having different sampling rates. A speech signal having a higher sampling rate corresponds to a larger number of initial speech frequency points obtained by fast Fourier transform.

In the foregoing embodiment, by performing Fourier transform processing on a speech signal, initial frequency bandwidth feature information corresponding to the speech signal can be quickly obtained.

Figure 3:
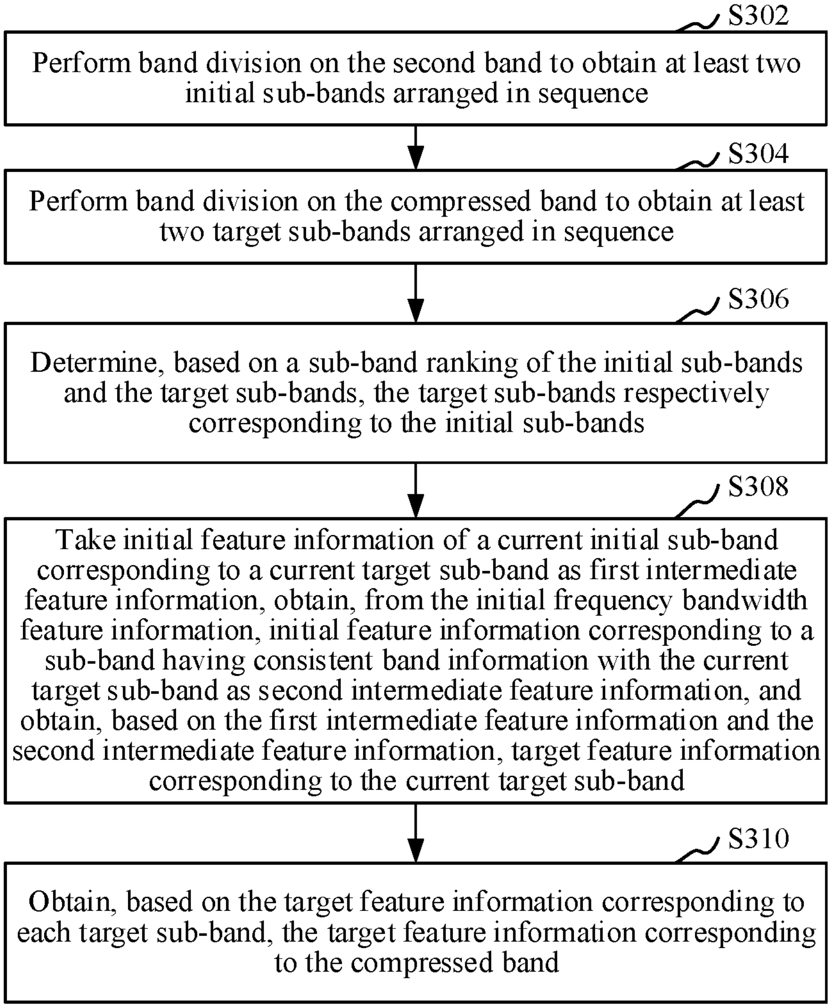
FIG. 3 is a schematic flowchart for performing feature compression on initial feature information to obtain target feature information in one embodiment.

In one embodiment, as shown in FIG. 3, the operation of performing feature compression on initial feature information corresponding to a second band in the initial frequency bandwidth feature information to obtain target feature information corresponding to a compressed band includes the following steps:

Step S302: Perform band division on the second band to obtain at least two initial sub-bands arranged in sequence.

Step S304: Perform band division on the compressed band to obtain at least two target sub-bands arranged in sequence.

The band division refers to dividing one band. One band is divided into a plurality of sub-bands. The band division performed by the speech transmitting end on the second band or the compressed band may be a linear division or a non-linear division. Taking the second band as an example, the speech transmitting end may perform linear band division on the second band, that is, divide the second band evenly. For example, the second band is 6-24 khz. The second band may be evenly divided into three equally-sized initial sub-bands, respectively 6-12 khz, 12-18 khz, and 18-24 khz. The speech transmitting end may also perform non-linear band division on the second band, that is, divide the second band not evenly. For example, the second band is 6-24 khz. The second band may be non-linearly divided into five initial sub-bands, respectively 6-8 khz, 8-10 khz, 10-12 khz, 12-18 khz, and 18-24 khz.

Specifically, the speech transmitting end may perform band division on the second band to obtain at least two initial sub-bands arranged in sequence, and perform band division on the compressed band to obtain at least two target sub-bands arranged in sequence. The number of the initial sub-bands and the number of the target sub-bands may be the same or different. When the number of the initial sub-bands is the same as the number of the target sub-bands, the initial frequency sub-bands correspond to the target frequency sub-bands one by one. When the number of the initial sub-bands is different from the number of the target sub-bands, a plurality of initial sub-bands may correspond to one target sub-band, or one initial sub-band may correspond to a plurality of target sub-bands.

Step S306: Determine, based on a sub-band ranking of the initial sub-bands and the target sub-bands, the target sub-bands respectively corresponding to the initial sub-bands.

Figure 4:
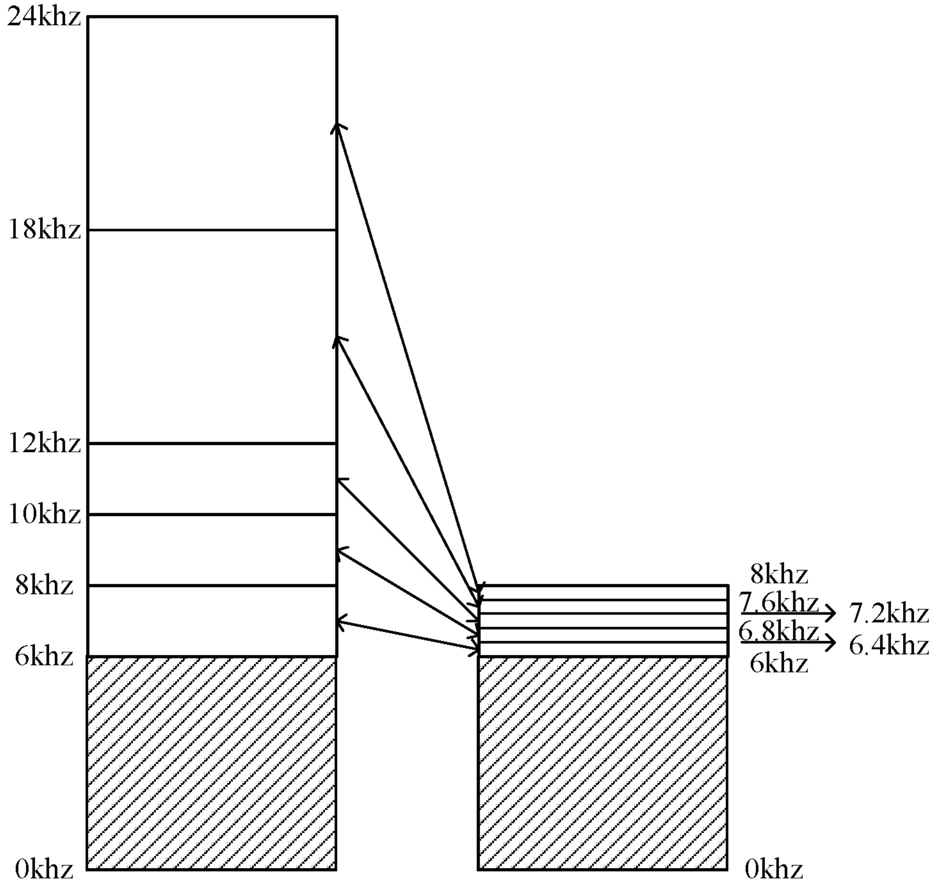
FIG. 4 is a schematic diagram of a mapping relationship between an initial sub-band and a target sub-band in one embodiment.

Specifically, the speech transmitting end may determine, based on a sub-band ranking of the initial sub-bands and the target sub-bands, the target sub-bands respectively corresponding to the initial sub-bands. When the number of the initial sub-bands is the same as the number of the target sub-bands, the speech transmitting end may establish an association relationship between the initial sub-bands and the target sub-bands in a consistent order. Referring to FIG. 4, the initial sub-bands arranged in sequence are 6-8 khz, 8-10 khz, 10-12 khz, 12-18 khz, and 18-24 khz, and the target sub-bands arranged in sequence are 6-6.4 khz, 6.4-6.8 khz, 6.8-7.2 khz, 7.2-7.6 khz, and 7.6-8 khz. Then 6-8 khz corresponds to 6-6.4 khz, 8-10 khz corresponds to 6.4-6.8 khz, 10-12 khz corresponds to 6.8-7.2 khz, 12-18 khz corresponds to 7.2-7.6 khz, and 18-24 khz corresponds to 7.6-8 khz. When the number of the initial sub-bands is different from the number of the target sub-bands, the speech transmitting end may establish a one-to-one association relationship between the top-ranked initial sub-bands and target sub-bands, establish a one-to-one association relationship between the last-ranked initial sub-bands and target sub-bands, and establish a one-to-many or many-to-one association relationship between the middle-ranked initial sub-bands and target sub-bands. For example, when the number of the middle ranked initial sub-bands is greater than the number of the target sub-bands, a many-to-one association relationship is established.

Step S308: Take initial feature information of a current initial sub-band corresponding to a current target sub-band as first intermediate feature information, obtain, from the initial frequency bandwidth feature information, initial feature information corresponding to a sub-band having consistent band information with the current target sub-band as second intermediate feature information, and obtain, based on the first intermediate feature information and the second intermediate feature information, target feature information corresponding to the current target sub-band.

Specifically, feature information corresponding to one band includes an amplitude and phase corresponding to at least one frequency point. During feature compression, the speech transmitting end may simply compress the amplitude while the phase follows an original phase. The current target sub-band refers to a target sub-band currently generating target feature information. When the target feature information corresponding to the current target sub-band is generated, the speech transmitting end may take initial feature information of a current initial sub-band corresponding to the current target sub-band as first intermediate feature information. The first intermediate feature information is used for determining an amplitude of a frequency point in the target feature information corresponding to the current target sub-band. The speech transmitting end may obtain, from the initial frequency bandwidth feature information, initial feature information corresponding to a sub-band having consistent band information with the current target sub-band as second intermediate feature information. The second intermediate feature information is used for determining an amplitude of a frequency point in the target feature information corresponding to the current target sub-band. Therefore, the speech transmitting end may obtain, based on the first intermediate feature information and the second intermediate feature information, the target feature information corresponding to the current target sub-band.

For example, the initial frequency bandwidth feature information includes initial feature information corresponding to 0-24 khz. The current target sub-band is 6-6.4 khz, and the initial sub-band corresponding to the current target sub-band is 6-8 khz. The speech transmitting end may obtain, based on the initial feature information corresponding to 6-8 khz and the initial feature information corresponding to 6-6.4 khz in the initial frequency bandwidth feature information, target feature information corresponding to 6-6.4 khz.

Step S310: Obtain, based on the target feature information corresponding to each target sub-band, the target feature information corresponding to the compressed band.

Specifically, after obtaining the target feature information corresponding to each target sub-band, the speech transmitting end may obtain, based on the target feature information corresponding to each target sub-band, the target feature information corresponding to the compressed band. The target feature information corresponding to the compressed band is composed of the target feature information corresponding to each target sub-band.

In the foregoing embodiment, by further subdividing the second band and the compressed band to perform feature compression, the reliability of feature compression can be improved, and the difference between the initial feature information corresponding to the second band and the target feature information corresponding to the compressed band can be reduced. In this way, a target speech signal having a high degree of similarity to the speech signal may be restored subsequently upon frequency bandwidth extension.

In one embodiment, the first intermediate feature information and the second intermediate feature information both include initial amplitudes and initial phases corresponding to a plurality of initial speech frequency points. The operation of obtaining, based on the first intermediate feature information and the second intermediate feature information, target feature information corresponding to the current target sub-band includes:

obtaining, based on a statistical value of the initial amplitude corresponding to each initial speech frequency point in the first intermediate feature information, a target amplitude of each target speech frequency point corresponding to the current target sub-band; obtaining, based on the initial phase corresponding to each initial speech frequency point in the second intermediate feature information, a target phase of each target speech frequency point corresponding to the current target sub-band; and obtaining, based on the target amplitude and the target phase of each target speech frequency point corresponding to the current target sub-band, the target feature information corresponding to the current target sub-band.

Specifically, for the amplitude of a frequency point, the speech transmitting end may perform statistics on the initial amplitude corresponding to each initial speech frequency point in the first intermediate feature information, and take a statistical value obtained through calculation as the target amplitude of each target speech frequency point corresponding to the current target sub-band. For the phase of the frequency point, the speech transmitting end may obtain, based on the initial phase corresponding to each initial speech frequency point in the second intermediate feature information, the target phase of each target speech frequency point corresponding to the current target sub-band. The speech transmitting end may obtain, from the second intermediate feature information, the initial phase of the initial speech frequency point having a consistent frequency with the target speech frequency point as the target phase of the target speech frequency point. That is, the target phase corresponding to the target speech frequency point follows the original phase. The statistical value may be an arithmetic mean, a weighted mean, or the like.

For example, the speech transmitting end may calculate an arithmetic mean of the initial amplitude corresponding to each initial speech frequency point in the first intermediate feature information, and take the arithmetic mean obtained through calculation as the target amplitude of each target speech frequency point corresponding to the current target sub-band.

The speech transmitting end may also calculate a weighted mean of the initial amplitude corresponding to each initial speech frequency point in the first intermediate feature information, and take the weighted mean obtained through calculation as the target amplitude of each target speech frequency point corresponding to the current target sub-band. For example, in general, the importance of a central frequency point is relatively high. The speech transmitting end may give a higher weight to an initial amplitude of a central frequency point of one band, give a lower weight to an initial amplitude of another frequency point in the band, and then perform weighted mean on the initial amplitude of each band to obtain a weighted mean.

The speech transmitting end may further subdivide an initial sub-band corresponding to the current target sub-band and the current target sub-band to obtain at least two first sub-bands arranged in sequence corresponding to the initial sub-band and at least two second sub-bands arranged in sequence corresponding to the current target sub-band. The speech transmitting end may establish an association relationship between the first sub-band and the second sub-band according to the ranking of the first sub-band and the second sub-band, and take the statistical value of the initial amplitude corresponding to each initial speech frequency point in the current first sub-band as the target amplitude of each target speech frequency point in the second sub-band corresponding to the current first sub-band. For example, the current target sub-band is 6-6.4 khz, and the initial sub-band corresponding to the current target sub-band is 6-8 khz. The initial sub-band and the current target sub-band are divided equally to obtain two first sub-bands (6-7 khz and 7-8 khz) and two second sub-bands (6-6.2 khz and 6.2-6.4 khz). 6-7 khz corresponds to 6-6.2 khz, and 7-8 khz corresponds to 6.2-6.4 khz. The arithmetic mean of the initial amplitude corresponding to each initial speech frequency point in 6-7 khz is calculated as the target amplitude corresponding to each target speech frequency point in 6-6.2 khz. The arithmetic mean of the initial amplitude corresponding to each initial speech frequency point in 7-8 khz is calculated as the target amplitude corresponding to each target speech frequency point in 6.2-6.4 khz.

In one embodiment, if a frequency bandwidth corresponding to the initial frequency bandwidth feature information is equal to a frequency bandwidth corresponding to the intermediate frequency bandwidth feature information, the number of initial speech frequency points corresponding to the initial frequency bandwidth feature information is equal to the number of target speech frequency points corresponding to the intermediate frequency bandwidth feature information. For example, the frequency bandwidths corresponding to the initial frequency bandwidth feature information and the intermediate frequency bandwidth feature information both are 24 khz. In the initial frequency bandwidth feature information and the intermediate frequency bandwidth feature information, amplitudes and phases of the speech frequency points corresponding to 0-6 khz are the same. In the intermediate frequency bandwidth feature information, the target amplitude of the target speech frequency point corresponding to 6-8 khz is obtained through calculation based on the initial amplitude of the initial speech frequency point corresponding to 6-24 khz in the initial frequency bandwidth feature information. The target phase of the target speech frequency point corresponding to 6-8 khz follows the initial phase of the initial speech frequency point corresponding to 6-8 khz in the initial frequency bandwidth feature information. In the intermediate frequency bandwidth feature information, the target amplitude and the target phase of the target speech frequency point corresponding to 8-24 khz are zero.

If the frequency bandwidth corresponding to the initial frequency bandwidth feature information is greater than the frequency bandwidth corresponding to the intermediate frequency bandwidth feature information, the number of initial speech frequency points corresponding to the initial frequency bandwidth feature information is greater than the number of target speech frequency points corresponding to the intermediate frequency bandwidth feature information. Further, a number ratio of the initial speech frequency points and the target speech frequency points may be the same as a width ratio of the frequency bandwidths of the initial frequency bandwidth feature information and the target frequency bandwidth feature information so as to convert the amplitude and the phase between the frequency points. For example, if the frequency bandwidth corresponding to the initial frequency bandwidth feature information is 24 khz and the frequency bandwidth corresponding to the intermediate frequency bandwidth feature information is 12 khz, the number of initial speech frequency points corresponding to the initial frequency bandwidth feature information may be 1024, and the number of target speech frequency points corresponding to the intermediate frequency bandwidth feature information may be 512. In the initial frequency bandwidth feature information and the intermediate frequency bandwidth feature information, the amplitude and phase of the speech frequency point corresponding to 0-6 khz are the same. In the intermediate frequency bandwidth feature information, the target amplitude of the target speech frequency point corresponding to 6-12 khz is obtained through calculation based on the initial amplitude of the initial speech frequency point corresponding to 6-24 khz in the initial frequency bandwidth feature information. The target phase of the target speech frequency point corresponding to 6-12 khz follows the initial phase of the initial speech frequency point corresponding to 6-12 khz in the initial frequency bandwidth feature information.

In the foregoing embodiment, in the target feature information corresponding to the compressed band, the amplitude of the target speech frequency point is a statistical value of the amplitude of the corresponding initial speech frequency point. The statistical value may reflect a mean level of the amplitude of the initial speech frequency point. The phase of the target speech frequency point follows the original phase, which can further reduce the difference between the initial feature information corresponding to the second band and the target feature information corresponding to the compressed band. In this way, a target speech signal having a high degree of similarity to the speech signal may be restored subsequently upon frequency bandwidth extension. The phase of the target speech frequency point follows the original phase, thereby reducing the amount of calculation and improving the efficiency of determining the target feature information.

In one embodiment, the operation of obtaining, based on the target feature information corresponding to the first band and the target feature information corresponding to the compressed band, intermediate frequency bandwidth feature information, and obtaining, based on the intermediate frequency bandwidth feature information, a compressed speech signal corresponding to the speech signal includes:

determining, based on a frequency difference between the compressed band and the second band, a third band, and set target feature information corresponding to the third band as invalid information; obtaining, based on the target feature information corresponding to the first band, the target feature information corresponding to the compressed band, and the target feature information corresponding to the third band, intermediate frequency bandwidth feature information; performing inverse Fourier transform processing on the intermediate frequency bandwidth feature information to obtain an intermediate speech signal, where a sampling rate corresponding to the intermediate speech signal is consistent with the sampling rate corresponding to the speech signal; and performing, based on the supported sampling rate, down-sampling processing on the intermediate speech signal to obtain the compressed speech signal.

The third band is a band composed of frequencies between the maximum frequency value of the compressed band and the maximum frequency value of the second band. The Inverse Fourier transform processing is to perform inverse Fourier transform on the intermediate frequency bandwidth feature information to convert a frequency domain signal into a time domain signal. Both the intermediate speech signal and the compressed speech signal are time domain signals.

The down-sampling refers to filtering and sampling the speech signals in time domain. For example, if the sampling rate of a signal is 48 khz, it means that 48 k points are acquired in one second. If the sampling rate of the signal is 16 khz, it means that 16 k points are acquired in one second.

Specifically, in order to improve the conversion speed of the frequency domain signal to the time domain signal, when performing frequency bandwidth compression, the speech transmitting end may remain the number of speech frequency points unchanged and modify the amplitudes and phases of part of the speech frequency points so as to obtain intermediate frequency bandwidth feature information. Further, the speech transmitting end may quickly perform inverse Fourier transform processing on the intermediate frequency bandwidth feature information to obtain an intermediate speech signal. A sampling rate corresponding to the intermediate speech signal is consistent with the sampling rate corresponding to the speech signal. Then, the speech transmitting end performs down-sampling processing on the intermediate speech signal to reduce the sampling rate of the intermediate speech signal to or below the supported sampling rate corresponding to the speech coder, to obtain the compressed speech signal. In the intermediate frequency bandwidth feature information, the target feature information corresponding to the first band follows the initial feature information corresponding to the first band in the initial frequency bandwidth feature information. The target feature information corresponding to the compressed band is obtained based on the initial feature information corresponding to the second band in the initial frequency bandwidth feature information. The target feature information corresponding to the third band is set as invalid information. That is, the target feature information corresponding to the third band is cleared.

In the foregoing embodiment, when processing a frequency domain signal, a frequency bandwidth remains unchanged, the frequency domain signal is converted into a time domain signal, and then a sampling rate of the signal is reduced through down-sampling processing, thereby reducing the complexity of frequency domain signal processing.

In one embodiment, the operation of coding the compressed speech signal through a speech coding module to obtain coded speech data corresponding to the speech signal includes:

performing speech coding on the compressed speech signal through the speech coding module to obtain first speech data; and performing channel coding on the first speech data to obtain the coded speech data.

The speech coding is used for compressing a data rate of a speech signal and removing redundancy in the signal. The speech coding is to code an analog speech signal, and convert the analog signal into a digital signal, thereby reducing the transmission code rate and performing digital transmission. The speech coding may also be referred to as source coding. The speech coding does not change the sampling rate of the speech signal. The speech signal before coding may be completely restored through decoding processing from bitstream data obtained through coding. However, frequency bandwidth compression may change the sampling rate of the speech signal. Through frequency bandwidth extension, the speech signal after frequency bandwidth cannot be completely restored into the speech signal before frequency bandwidth. However, the semantic contents transferred by the speech signals before and after frequency bandwidth are the same, thereby not affecting the listener's understanding. The speech transmitting end may perform speech coding on the compressed speech signal by using speech coding modes such as waveform coding, parametric coding (sound source coding), and hybrid coding.

The channel coding is used for improving the stability of data transmission. Due to the interference and fading of mobile communication and network transmission, errors may occur in the process of speech signal transmission. Therefore, it is necessary to use an error correction and detection technology, that is, an error correction and detection coding technology, for digital signals to enhance the ability of data transmission in the channel to resist various interference and improve the reliability of speech transmission. Error correction and detection coding performed on a digital signal to be transmitted in a channel is referred to as the channel coding. The speech transmitting end may perform channel coding on the first speech data by using channel coding modes such as convolutional codes and Turbo codes.

Specifically, when performing coding processing, the speech transmitting end may perform speech coding on the compressed speech signal through the speech coding module to obtain first speech data, and then perform channel coding on the first speech data to obtain the coded speech data. It will be appreciated that the speech coding module may only integrate a speech coding algorithm. Then the speech transmitting end may perform speech coding on the compressed speech signal through the speech coding module, and perform channel coding on the first speech data through other modules and software programs. The speech coding module may also integrate a speech coding algorithm and a channel coding algorithm at the same time. The speech transmitting end performs speech coding on the compressed speech signal through the speech coding module to obtain the first speech data, and performs channel coding on the first speech data through the speech coding module to obtain the coded speech data.

In the foregoing embodiment, by performing speech coding and channel coding on a compressed speech signal, the amount of data in speech signal transmission can be reduced, and the stability of the speech signal transmission can be ensured.

In one embodiment, the method further includes:

transmitting the coded speech data to a speech receiving end such that the speech receiving end performs speech restoration processing on the coded speech data to obtain a target speech signal corresponding to the speech signal, the target speech signal being used for playing.

The speech receiving end refers to a device for performing speech decoding. The speech receiving end may receive speech data transmitted by the speech transmitting end and decode and play the received speech data. The speech restoration processing is used for restoring the coded speech data into a playable speech signal. For example, a low-sampling rate speech signal obtained through decoding is restored into a high-sampling rate speech signal. Bitstream data having a small amount of data is decoded into a speech signal having a large amount of data.

Specifically, the speech transmitting end may transmit the coded speech data to the speech receiving end. After receiving the coded speech data, the speech receiving end may perform speech restoration processing on the coded speech data to obtain a target speech signal corresponding to the speech signal, so as to play the target speech signal.

When performing speech restoration processing, the speech receiving end may only decode the coded speech data to obtain the compressed speech signal, take the compressed speech signal as the target speech signal, and play the compressed speech signal. At this moment, although the sampling rate of the compressed speech signal is lower than the sampling rate of the originally acquired speech signal, the semantic contents reflected by the compressed speech signal and the speech signal are consistent, and the compressed speech signal may also be understood by a listener.

Certainly, in order to further improve the playing clarity and intelligibility of the speech signal, when performing speech restoration processing, the speech receiving end may decode the coded speech data to obtain the compressed speech signal, restore the compressed speech signal having a low sampling rate into the speech signal having a high sampling rate, and take the speech signal obtained through restoration as the target speech signal. At this moment, the target speech signal refers to a speech signal obtained by performing frequency bandwidth extension on the compressed speech signal corresponding to the speech signal. The sampling rate of the target speech signal is consistent with the sampling rate of the speech signal. It will be appreciated that there is a certain loss of information when performing frequency bandwidth extension. Therefore, the target speech signal restored by frequency bandwidth extension and the original speech signal are not completely consistent. However, the semantic contents reflected by the target speech signal and the speech signal are consistent. Moreover, compared with the compressed speech signal, the target speech signal has a larger frequency bandwidth, contains more abundant information, has a better sound quality, and has a clear and understandable sound.

In the foregoing embodiment, the coded speech data may be applied to speech communication and speech transmission. By compressing the high-sampling rate speech signal into the low-sampling rate speech signal for transmission, speech transmission costs can be reduced.

In one embodiment, the operation of transmitting the coded speech data to a speech receiving end such that the speech receiving end performs speech restoration processing on the coded speech data to obtain a target speech signal corresponding to the speech signal, and plays the target speech signal includes:

obtaining, based on the second band and the compressed band, compression identification information corresponding to the speech signal; and transmitting the coded speech data and the compression identification information to the speech receiving end such that the speech receiving end decodes the coded speech data to obtain a compressed speech signal, and performing, based on the compression identification information, frequency bandwidth extension on the compressed speech signal to obtain the target speech signal.

The compression identification information is used for identifying band mapping information between the second band and the compressed band. The band mapping information includes sizes of the second band and the compressed band, and a mapping relationship (a corresponding relationship and an association relationship) between subbands of the second band and the compressed band. The frequency bandwidth extension may improve the sampling rate of the speech signal while keeping speech content intelligible. The frequency bandwidth extension refers to extending a small-frequency bandwidth speech signal into a large-frequency bandwidth speech signal. The small-frequency bandwidth speech signal and the large-frequency bandwidth speech signal have the same low-frequency information therebetween.

Specifically, after receiving the coded speech data, the speech receiving end may default that the coded speech data has been subjected to frequency bandwidth compression, automatically decode the coded speech data to obtain a compressed speech signal, and perform frequency bandwidth extension on the compressed speech signal to obtain a target speech signal. However, considering the compatibility diversity of band mapping information in the traditional speech processing method and feature compression, when the speech transmitting end transmits the coded speech data to the speech receiving end, the speech transmitting end may synchronously transmit compression identification information to the speech receiving end, so that the speech receiving end quickly identifies whether the coded speech data is subjected to frequency bandwidth compression and identifies the band mapping information in the frequency bandwidth compression, thereby deciding whether to directly decode and play the coded speech data or to play the coded speech data through the corresponding frequency bandwidth extension after decoding. In one embodiment, in order to save the computational resources of the speech transmitting end, for a speech signal having a sampling rate originally less than or equal to that of the speech coder, the speech transmitting end may choose to use the traditional speech processing method to directly code the speech signal and then transmit the speech signal to the speech receiving end.

If the speech transmitting end performs frequency bandwidth compression on the speech signal, the speech transmitting end may generate, based on the second band and the compressed band, compression identification information corresponding to the speech signal, and transmit the coded speech data and the compression identification information to the speech receiving end, so that the speech receiving end performs, based on the band mapping information corresponding to the compression identification information, frequency bandwidth extension on the compressed speech signal to obtain the target speech signal. The compressed speech signal is obtained by decoding the coded speech data through the speech receiving end.

In addition, if default band mapping information is agreed between the speech transmitting end and the speech receiving end, when the compression identification information corresponding to the speech signal is generated based on the second band and the compressed band, the speech transmitting end may directly obtain a pre-agreed special identifier as the compression identification information. The special identifier is used for identifying that the compressed speech signal is obtained by performing frequency bandwidth compression based on the default band mapping information. After receiving the coded speech data and the compression identification information, the speech receiving end may decode the coded speech data to obtain the compressed speech signal, and perform, based on the default band mapping information, frequency bandwidth extension on the compressed speech signal to obtain the target speech signal. If multiple types of band mapping information are stored between the speech transmitting end and the speech receiving end, preset identifiers respectively corresponding to various types of band mapping information may be agreed between the speech transmitting end and the speech receiving end. Different band mapping information may be that the sizes of the second band and the compressed band are different, the division methods of the sub-bands are different, or the like. When the compression identification information corresponding to the speech signal is generated based on the second band and the compressed band, the speech transmitting end may obtain, based on the band mapping information used by the second band and the compressed band when performing feature compression, the corresponding preset identifier as the compression identification information. After receiving the coded speech data and the compression identification information, the speech receiving end may perform, based on the band mapping information corresponding to the compression identification information, frequency bandwidth extension on the compressed speech signal obtained through decoding to obtain the target speech signal. Certainly, the compression identification information may also directly include specific band mapping information.

It will be appreciated that for the specific process of performing frequency bandwidth extension on the compressed speech signal, reference may be made to methods described in various related embodiments of a subsequent speech decoding method, for example, a method including steps S506 to S510.

In one embodiment, dedicated band mapping information may be designed for different applications. For example, applications with high sound quality requirements (for example, singing applications) may be designed to adopt a larger number of sub-bands during feature compression, thereby maximally preserving the overall frequency-domain features of an original speech signal and the overall trend of frequency point amplitudes. Applications with low sound quality requirements (for example, instant messaging applications) may be designed to adopt a smaller number of sub-bands during feature compression, thereby speeding up compression while ensuring semantic intelligibility. Therefore, the compression identification information may also be an application identifier. After receiving the coded speech data and the compression identification information, the speech receiving end may perform, based on the band mapping information corresponding to the application identifier, corresponding frequency bandwidth extension on the compressed speech signal obtained through decoding to obtain the target speech signal.

In the foregoing embodiment, the coded speech data and the compression identification information are transmitted to the speech receiving end, so that the speech receiving end may perform frequency bandwidth extension on the compressed speech signal obtained through decoding more accurately, to obtain the target speech signal with a high degree of restoration.

Figure 5:
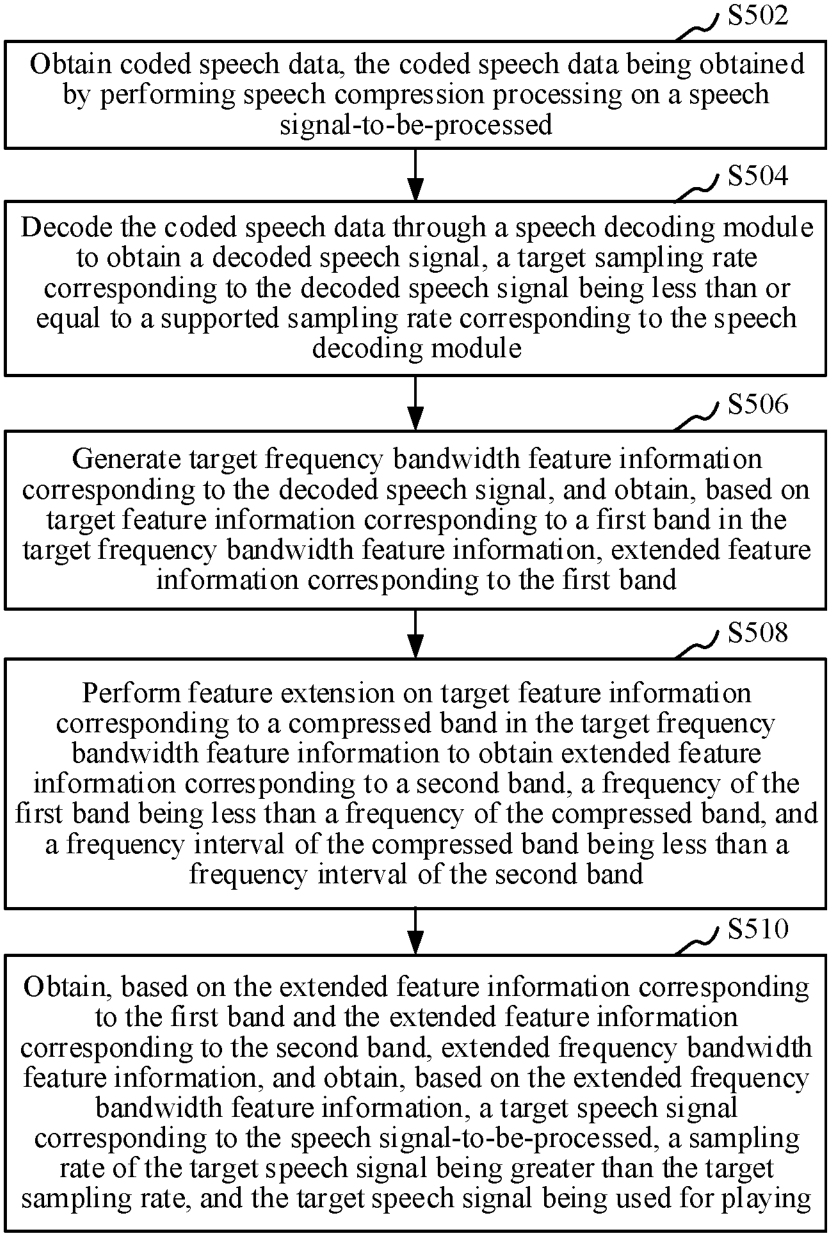
FIG. 5 is a schematic flowchart of a speech decoding method in one embodiment.

In one embodiment, as shown in FIG. 5, a speech decoding method is provided. The method is illustrated by using the speech receiving end in FIG. 1 as an example, and includes the following steps:

Step S502: Obtain coded speech data. The coded speech data is obtained by performing speech compression processing on a speech signal.

The speech compression processing is used for compressing the speech signal into bitstream data which may be transmitted, for example, compressing a high-sampling rate speech signal into a low-sampling rate speech signal and then coding the low-sampling rate speech signal into bitstream data, or coding a speech signal having a large amount of data into bitstream data having a small amount of data.

Specifically, the speech receiving end obtains coded speech data. The coded speech data may be obtained by coding the speech signal through the speech receiving end, and may also be transmitted by the speech transmitting end and received by the speech receiving end. The coded speech data may be obtained by coding the speech signal, or may be obtained by performing frequency bandwidth compression on the speech signal to obtain a compressed speech signal and coding the compressed speech signal.

Step S504: Decode the coded speech data through a speech decoding module to obtain a decoded speech signal. A target sampling rate corresponding to the decoded speech signal is less than or equal to a supported sampling rate corresponding to the speech decoding module.

The speech decoding module is a module for decoding a speech signal. The speech decoding module may be either hardware or software. The speech coding module and the speech decoding module may be integrated on one module. The supported sampling rate corresponding to the speech decoding module refers to a maximum sampling rate supported by the speech decoding module, that is, an upper sampling rate limit. It will be appreciated that if the supported sampling rate corresponding to the speech decoding module is 16 khz, the speech decoding module may decode a speech signal having a sampling rate less than or equal to 16 khz.

Specifically, after obtaining the coded speech data, the speech receiving end may decode the coded speech data through the speech decoding module to obtain the decoded speech signal, and restore the speech signal before coding. The speech decoding module supports processing of a speech signal having a sampling rate less than or equal to the upper sampling rate limit. The decoded speech signal is a time domain signal.

It will be appreciated that if the coded speech data is generated locally at the speech receiving end, decoding the coded speech data by the speech receiving end may also be: performing speech decoding on the coded speech data to obtain the decoded speech signal.

Step S506: Generate target frequency bandwidth feature information corresponding to the decoded speech signal, and obtain, based on target feature information corresponding to a first band in the target frequency bandwidth feature information, extended feature information corresponding to the first band.

A target frequency bandwidth corresponding to the decoded speech signal includes a first band and a compressed band. A frequency of the first band is less than a frequency of the compressed band. The speech receiving end may divide the target frequency bandwidth feature information into target feature information corresponding to the first band and target feature information corresponding to the compressed band. That is, the target frequency bandwidth feature information may be divided into target feature information corresponding to a low band and target feature information corresponding to a high band. The target feature information refers to feature information corresponding to each frequency before frequency bandwidth extension. The extended feature information refers to feature information corresponding to each frequency after frequency bandwidth extension.

Specifically, the speech receiving end may extract frequency domain features of the decoded speech signal, convert a time domain signal into a frequency domain signal, and obtain target frequency bandwidth feature information corresponding to the decoded speech signal. It will be appreciated that if the sampling rate of the speech signal is higher than the supported sampling rate corresponding to the speech coding module, the speech encoder side performs frequency bandwidth compression on the speech signal to reduce the sampling rate of the speech signal. At this moment, the speech receiving end is required to perform frequency bandwidth extension on the decoded speech signal so as to restore the speech signal having a high sampling rate. At this moment, the decoded speech signal is a compressed speech signal. If the speech signal is not subjected to frequency bandwidth compression, the speech receiving end may also perform frequency bandwidth extension on the decoded speech signal to improve the sampling rate of the decoded speech signal and enrich frequency domain information.

In order to remain the semantic content unchanged and intelligible naturally, the speech receiving end may remain low-frequency information unchanged and extend high-frequency information. Therefore, the speech receiving end may obtain, based on the target feature information corresponding to the first band in the target frequency bandwidth feature information, extended feature information corresponding to the first band, and take the initial feature information corresponding to the first band in the target frequency bandwidth feature information as extended feature information corresponding to the first band in the extended frequency bandwidth feature information. That is, the low-frequency information remains unchanged before and after the frequency bandwidth extension, and the low-frequency information is consistent. Similarly, the speech receiving end may divide, band based on a preset frequency, the target band into the first band and the compressed band.

Step S508: Perform feature extension on target feature information corresponding to a compressed band in the target frequency bandwidth feature information to obtain extended feature information corresponding to a second band. A frequency of the first band is less than a frequency of the compressed band, and a frequency interval of the compressed band is less than a frequency interval of the second band.

The feature extension is to extend feature information corresponding to a small band into feature information corresponding to a large band, thereby enriching the feature information. The compressed band represents a small band, and the second band represents a large band. That is, the frequency interval of the compressed band is less than the frequency interval of the second band. That is, the length of the compressed band is less than the length of the second band.

Specifically, when performing the frequency bandwidth extension, the speech receiving end mainly extends the high-frequency information in the speech signal. The speech receiving end may perform feature extension on the target feature information corresponding to the compressed band in the target frequency bandwidth feature information to obtain the extended feature information corresponding to the second band.

In one embodiment, the target frequency bandwidth feature information includes amplitudes and phases corresponding to a plurality of target speech frequency points. When performing feature extension, the speech receiving end may copy the amplitude of the target speech frequency point corresponding to the compressed band in the target frequency bandwidth feature information to obtain the amplitude of the initial speech frequency point corresponding to the second band, copy or randomly assign the phase of the target speech frequency point corresponding to the compressed band in the target frequency bandwidth feature information to obtain the phase of the initial speech frequency point corresponding to the second band, thereby obtaining the extended feature information corresponding to the second band. The copying of the amplitude may further include segmented copying in addition to global copying.

Step S510: Obtain, based on the extended feature information corresponding to the first band and the extended feature information corresponding to the second band, extended frequency bandwidth feature information, and obtain, based on the extended frequency bandwidth feature information, a target speech signal corresponding to the speech signal. A sampling rate of the target speech signal is greater than the target sampling rate, and the target speech signal is used for playing.

The extended frequency bandwidth feature information refers to feature information obtained after extension on the target frequency bandwidth feature information. The target speech signal refers to a speech signal obtained after performing frequency bandwidth extension on the decoded speech signal. The frequency bandwidth extension may improve the sampling rate of the speech signal while keeping speech content intelligible. It will be appreciated that the sampling rate of the target speech signal is greater than the corresponding sampling rate of the decoded speech signal.

Specifically, the speech receiving end obtains, based on the extended feature information corresponding to the first band and the extended feature information corresponding to the second band, the extended frequency bandwidth feature information. The extended frequency bandwidth feature information is a frequency domain signal. After obtaining the extended frequency bandwidth feature information, the speech receiving end may convert the frequency domain signal into a time domain signal so as to obtain the target speech signal. For example, the speech receiving end performs inverse Fourier transform processing on the extended frequency bandwidth feature information to obtain the target speech signal.

For example, the sampling rate of the decoded speech signal is 16 khz, and the target frequency bandwidth is 0-8 khz. The speech receiving end may obtain target feature information corresponding to 0-6 khz from the target frequency bandwidth feature information, and directly take the target feature information corresponding to 0-6 khz as extended feature information corresponding to 0-6 khz. The speech receiving end may obtain target feature information corresponding to 6-8 khz from the target frequency bandwidth feature information, and extend the target feature information corresponding to 6-8 khz into extended feature information corresponding to 6-24 khz. The speech receiving end may generate, based on the extended feature information corresponding to 0-24 khz, the target speech signal. The sampling rate corresponding to the target speech signal is 48 khz.

The target speech signal is used for playing. After obtaining the target speech signal, the speech receiving end may play the target speech signal through a loudspeaker.

In the foregoing speech decoding method, coded speech data is obtained. The coded speech data is obtained by performing speech compression processing on a speech signal. The coded speech data is decoded through a speech decoding module to obtain a decoded speech signal. A target sampling rate corresponding to the decoded speech signal is less than or equal to a supported sampling rate corresponding to the speech decoding module. Target frequency bandwidth feature information corresponding to the decoded speech signal is generated. Based on target feature information corresponding to a first band in the target frequency bandwidth feature information, extended feature information corresponding to the first band is obtained. Feature extension is performed on target feature information corresponding to a compressed band in the target frequency bandwidth feature information to obtain extended feature information corresponding to a second band. A frequency of the first band is less than a frequency of the compressed band, and a frequency interval of the compressed band is less than a frequency interval of the second band. Extended frequency bandwidth feature information is obtained based on the extended feature information corresponding to the first band and the extended feature information corresponding to the second band, and a target speech signal corresponding to the speech signal is obtained based on the extended frequency bandwidth feature information. A sampling rate of the target speech signal is greater than the target sampling rate, and the target speech signal is used for playing. In this way, after coded speech data obtained through speech compression processing is obtained, the coded speech data may be decoded to obtain a decoded speech signal. Through the extension of band feature information, the sampling rate of the decoded speech signal may be increased to obtain a target speech signal for playing. The playing of a speech signal is not subject to the sampling rate supported by the speech decoder. During speech playing, a high-sampling rate speech signal with more abundant information may also be played.

In one embodiment, the operation of decoding the coded speech data through a speech decoding module to obtain a decoded speech signal includes:

performing channel decoding on the coded speech data to obtain second speech data; and performing speech decoding on the second speech data through the speech decoding module to obtain the decoded speech signal.

Specifically, channel decoding may be considered as the inverse of channel coding. The speech decoding may be considered as the inverse of speech coding. When decoding the coded speech data, the speech receiving end first performs channel decoding on the coded speech data to obtain second speech data, and then performs speech decoding on the second speech data through the speech decoding module to obtain the decoded speech signal. It will be appreciated that the speech decoding module may only integrate a speech decoding algorithm. Then the speech receiving end may perform channel decoding on the coded speech data through other modules and software programs, and perform speech decoding on the second speech data through the speech decoding module. The speech decoding module may also integrate a speech decoding algorithm and a channel decoding algorithm at the same time. Then the speech receiving end may perform channel decoding on the coded speech data through the speech decoding module to obtain the second speech data, and perform speech decoding on the second speech data through the speech decoding module to obtain the decoded speech signal.

In the foregoing embodiment, based on channel decoding and speech decoding, binary data may be restored into a time domain signal to obtain a speech signal.

In one embodiment, the operation of performing feature extension on the target feature information corresponding to the compressed band in the target frequency bandwidth feature information to obtain the extended feature information corresponding to the second band includes:

obtaining band mapping information, where the band mapping information is used for determining a mapping relationship between at least two target sub-bands corresponding to the compressed band and at least two initial sub-bands corresponding to the second band; and performing, based on the band mapping information, feature extension on the target feature information corresponding to the compressed band in the target frequency bandwidth feature information to obtain the extended feature information corresponding to the second band.

The band mapping information is used for determining a mapping relationship between at least two target sub-bands corresponding to the compressed band and at least two initial sub-bands corresponding to the second band. When performing feature compression, the speech encoder side performs, based on the mapping relationship, feature compression on the initial feature information corresponding to the second band in the initial frequency bandwidth feature information to obtain the target feature information corresponding to the compressed band. Then, when performing feature extension, the speech decoder side performs, based on the mapping relationship, feature extension on the target feature information corresponding to the compressed band in the target frequency bandwidth feature information so as to maximally restore the initial feature information corresponding to the second band and obtain the extended feature information corresponding to the second band.

Specifically, the speech receiving end may obtain band mapping information, and perform, based on the band mapping information, feature extension on the target feature information corresponding to the compressed band in the target frequency bandwidth feature information to obtain the extended feature information corresponding to the second band. The speech receiving end and the speech transmitting end may agree on default band mapping information in advance. The speech transmitting end performs, based on the default band mapping information, feature compression. The speech receiving end performs, based on the default band mapping information, feature extension. The speech receiving end and the speech transmitting end may also agree on a plurality of candidate band mapping information in advance. The speech transmitting end selects one type of band mapping information therefrom to perform feature compression, generates compression identification information and transmits the compression identification information to the speech receiving end. Thus, the speech receiving end may determine, based on the compression identification information, corresponding band mapping information, and then perform, based on the band mapping information, feature extension. Regardless of whether the decoded speech signal is subjected to band compression or not, the speech receiving end may directly default that the decoded speech signal is a speech signal obtained after band compression. At this moment, the band mapping information may be preset and uniform band mapping information.

In the foregoing embodiment, feature extension is performed on the target feature information corresponding to the compressed band in the target frequency bandwidth feature information based on the band mapping information to obtain the extended feature information corresponding to the second band, so that more accurate extended feature information can be obtained, which is helpful to obtain a target speech signal having a higher degree of restoration.

In one embodiment, the coded speech data carries compression identification information. The operation of obtaining band mapping information includes:

obtaining, based on the compression identification information, the band mapping information.

Specifically, when performing frequency bandwidth compression, the speech receiving end may generate, based on the band mapping information used in feature compression, compression identification information, and associate the coded speech data corresponding to the compressed speech signal with the corresponding compression identification information. Thus, when subsequently performing frequency bandwidth extension, the speech receiving end may obtain, based on the compression identification information carried in the coded speech data, corresponding band mapping information, and perform, based on the band mapping information, frequency bandwidth extension on the decoded speech signal obtained through decoding. For example, when performing frequency bandwidth compression, the speech transmitting end may generate, based on the band mapping information used in feature compression, the compression identification information. Subsequently, the speech transmitting end transmits the coded speech data and the compression identification information together to the speech receiving end. The speech receiving end may obtain, based on the compression identification information, the band mapping information to perform frequency bandwidth extension on the decoded speech signal obtained through decoding.

In the foregoing embodiment, based on the compression identification information, it may be determined that the decoded speech signal is obtained through band compression, and correct band mapping information may be quickly obtained so as to restore a relatively accurate target speech signal.

In one embodiment, the operation of performing, based on the band mapping information, feature extension on the target feature information corresponding to the compressed band in the target frequency bandwidth feature information to obtain the extended feature information corresponding to the second band includes:

taking target feature information of a current target sub-band corresponding to a current initial sub-band as third intermediate feature information, obtaining, from the target frequency bandwidth feature information, target feature information corresponding to a sub-band having consistent band information with the current initial sub-band as fourth intermediate feature information, and obtaining, based on the third intermediate feature information and the fourth intermediate feature information, extended feature information corresponding to the current initial sub-band; and obtaining, based on the extended feature information corresponding to each initial sub-band, the extended feature information corresponding to the second band.

Specifically, the speech receiving end may determine, based on the band mapping information, a mapping relationship between at least two target sub-bands corresponding to the compressed band and at least two initial sub-bands corresponding to the second band, and thus perform feature extension based on the target feature information corresponding to each target sub-band to obtain extended feature information of the initial sub-band respectively corresponding to each target sub-band, thereby finally obtaining extended feature information corresponding to the second band. The current initial sub-band refers to an initial sub-band to which the extended feature information is currently to be generated. When the extended feature information corresponding to the current initial sub-band is generated, the speech receiving end may take target feature information of a current target sub-band corresponding to a current initial sub-band as third intermediate feature information. The third intermediate feature information is used for determining the amplitude of a frequency point in the extended feature information corresponding to the current initial sub-band. The speech receiving end may obtain, from the target frequency bandwidth feature information, target feature information corresponding to a sub-band having consistent band information with the current initial sub-band as fourth intermediate feature information. The fourth intermediate feature information is used for determining the phase of the frequency point in the extended feature information corresponding to the current initial sub-band. Therefore, the speech receiving end may obtain, based on the third intermediate feature information and the fourth intermediate feature information, extended feature information corresponding to the current initial sub-band. After obtaining the extended feature information corresponding to each initial sub-band, the speech receiving end may obtain, based on the extended feature information corresponding to each initial sub-band, the extended feature information corresponding to the second band. The extended feature information corresponding to the second band is composed of the extended feature information corresponding to each initial sub-band.

For example, the target frequency bandwidth feature information includes target feature information corresponding to 0-8 khz. The current initial sub-band is 6-8 khz, and the target sub-band corresponding to the current initial sub-band is 6-6.4 khz. The speech receiving end may obtain, based on the target feature information corresponding to 6-6.4 khz and the target feature information corresponding to 6-8 khz the target frequency bandwidth feature information, extended feature information corresponding to 6-8 khz.

In the foregoing embodiment, by further subdividing the compressed band and the second band to perform feature extension, the reliability of feature extension can be improved, and the difference between the extended feature information corresponding to the second band and the initial feature information corresponding to the second band can be reduced. In this way, a target speech signal having a high degree of similarity to the speech signal can be restored finally.

In one embodiment, the third intermediate feature information and the fourth intermediate feature information both include target amplitudes and target phases corresponding to a plurality of target speech frequency points. The operation of obtaining, based on the third intermediate feature information and the fourth intermediate feature information, extended feature information corresponding to the current initial sub-band includes:

obtaining, based on the target amplitude corresponding to each target speech frequency point in the third intermediate feature information, a reference amplitude of each initial speech frequency point corresponding to the current initial sub-band; adding a random disturbance value to a phase of each initial speech frequency point corresponding to the current initial sub-band when the fourth intermediate feature information is null, to obtain a reference phase of each initial speech frequency point corresponding to the current initial sub-band; obtaining, based on the target phase corresponding to each target speech frequency point in the fourth intermediate feature information, a reference phase of each initial speech frequency point corresponding to the current initial sub-band when the fourth intermediate feature information is not null; and obtaining, based on the reference amplitude and the reference phase of each initial speech frequency point corresponding to the current initial sub-band, the extended feature information corresponding to the current initial sub-band.

Specifically, for the amplitude of a frequency point, the speech receiving end may take the target amplitude corresponding to each target speech frequency point in the third intermediate feature information as a reference amplitude of each initial speech frequency point corresponding to the current initial sub-band. For the phase of the frequency point, if the fourth intermediate feature information is null, the speech receiving end adds a random disturbance value to the target phase of each target speech frequency point corresponding to the current target sub-band to obtain a reference phase of each initial speech frequency point corresponding to the current initial sub-band. It will be appreciated that if the fourth intermediate feature information is null, it means that the current initial sub-band does not exist in the target frequency bandwidth feature information. Neither this part nor the phase thereof has energy. However, the frequency point is required to have an amplitude and a phase when converting the frequency domain signal into the time domain signal. The amplitude may be obtained by copying, and the phase may be obtained by adding the random disturbance value. Moreover, human ears are not sensitive to a high-frequency phase, and the random phase assignment of a high-frequency part is less affected. If the fourth intermediate feature information is not null, the speech receiving end may obtain, from the fourth intermediate feature information, the target phase of the target speech frequency point having a consistent frequency with the initial speech frequency point as the reference phase of the initial speech frequency point. That is, the reference phase corresponding to the initial speech frequency point may follow the original phase. The random disturbance value is a random phase value. It will be appreciated that the value of the reference phase is required to be within the value range of the phase.

For example, the target frequency bandwidth feature information includes target feature information corresponding to 0-8 khz, and the extended frequency bandwidth feature information includes extended feature information corresponding to 0-24 khz. If the current initial frequency sub-band is 6-8 khz and the target frequency sub-band corresponding to the current initial frequency sub-band is 6-6.4 khz, the speech receiving end may take the target amplitude of each target speech frequency point corresponding to 6-6.4 khz as the reference amplitude of each initial speech frequency point corresponding to 6-8 khz, and take the target phase of each target speech frequency point corresponding to 6-6.4 khz as the reference phase of each initial speech frequency point corresponding to 6-8 khz. If the current initial frequency sub-band is 8-10 khz and the target frequency sub-band corresponding to the current initial frequency sub-band is 6.4-6.8 khz, the speech receiving end may take the target amplitude of each target speech frequency point corresponding to 6.4-6.8 as the reference amplitude of each initial speech frequency point corresponding to 8-10 khz, and take the target phase of each target speech frequency point corresponding to 6.4-6.8 plus the random disturbance value as the reference phase of each initial speech frequency point corresponding to 8-10 khz.

In one embodiment, the number of the initial speech frequency points in the extended frequency bandwidth feature information may be equal to the number of the initial speech frequency points in the initial frequency bandwidth feature information. The number of the initial speech frequency points corresponding to the second band in the extended frequency bandwidth feature information is greater than the number of the target speech frequency points corresponding to the compressed band in the target frequency bandwidth feature information, and a number ratio of the initial speech frequency points and the target speech frequency points is a band ratio of the extended frequency bandwidth feature information and the target frequency bandwidth feature information.

In the foregoing embodiment, in the extended feature information corresponding to the second band, the amplitude of the initial speech frequency point is the amplitude of the corresponding target speech frequency point, and the phase of the initial speech frequency point follows the original phase or is a random value, so that the difference between the extended feature information corresponding to the second band and the initial feature information corresponding to the second band can be reduced.

This application also provides an application scenario. The speech coding method and the speech decoding method are applied to the application scenario. Specifically, the application of the speech coding method and the speech decoding method to the application scenario is as follows.

Speech signal codec plays an important role in modern communication systems. The speech signal codec can effectively reduce the bandwidth of speech signal transmission, and plays a decisive role in saving speech information storage and transmission costs and ensuring the integrity of speech information in the transmission process of communication networks.

Speech clarity has a direct relationship with spectral bands, traditional fixed-line telephones use a narrow-band speech, the sampling rate is 8 khz, the sound quality is poor, the sound is fuzzy, and the intelligibility is low. However, current voice over Internet protocol (VoIP) phones generally use a wideband speech, the sampling rate is 16 khz, the sound quality is good, and the sound is clear and intelligible. A better sound quality experience is ultra-wideband and even full-band speech, the sampling rate may reach 48 khz, and the sound fidelity is higher. The speech coders used at different sampling rates are different or adopt different modes of the same coder, and the sizes of the corresponding speech coding bitstreams are also different. Conventional speech coders only support processing of speech signals having a specific sampling rate. For example, an adaptive multi rate-narrow band speech codec (AMR-NB) coder only supports input signals of 8 khz and below, and an adaptive multi-rate-wideband speech codec (AMR-WB) coder only supports input signals of 16 khz and below.

In addition, in general, a higher sampling rate corresponds to a larger bandwidth of a speech coding bitstream to be consumed. If a better speech experience is required, a speech frequency bandwidth is required to be improved. For example, the sampling rate is improved from 8 khz to 16 khz or even 48 khz, or the like. However, the existing scheme is required to modify and replace a speech codec of the existing client and backstage transmission system. Meanwhile, the speech transmission bandwidth increases, which tends to increase the operation cost. It will be appreciated that the end-to-end speech sampling rate in the existing scheme is subject to the setting of a speech coder, and a better sound quality experience cannot be obtained since the speech frequency bandwidth cannot be broken through. If the sound quality experience is to be improved, speech codec parameters are to be modified or another speech codec supported by a higher sampling rate is to be replaced. This tends to cause system upgrades, increased operation costs, higher development workloads, and longer development cycles.

However, by using the speech coding method and the speech decoding method in this application, without changing the speech codec and the signal transmission system of the existing call system, the speech sampling rate of the existing call system may be upgraded, the call experience beyond the existing speech frequency bandwidth can be realized, the speech clarity and intelligibility can be effectively improved, and the operation cost is not substantially affected.

Figure 6A:
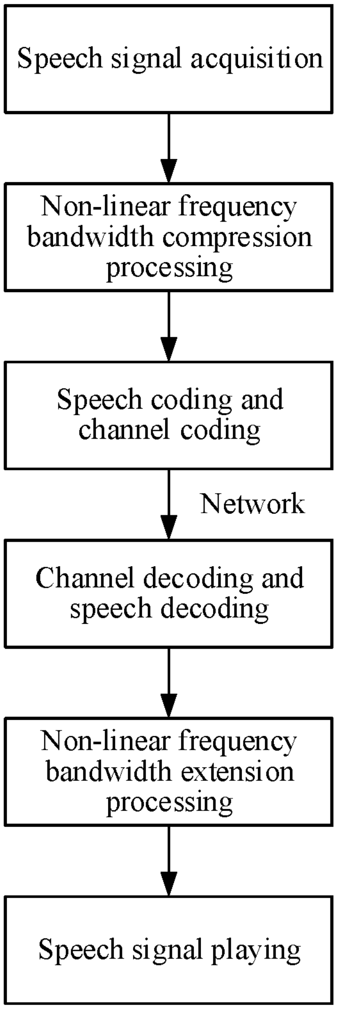
FIG. 6A is a schematic flowchart of a speech coding method and a speech decoding method in one embodiment.

Referring to FIG. 6A, the speech transmitting end acquires a high-quality speech signal, performs non-linear frequency bandwidth compression processing on the speech signal, and compresses an original high-sampling rate speech signal into a low-sampling rate speech signal supported by a speech coder of a call system through the non-linear frequency bandwidth compression processing. The speech transmitting end then performs speech coding and channel coding on the compressed speech signal, and finally transmits the speech signal to the speech receiving end through a network.

1. Non-Linear Frequency Bandwidth Compression Processing

In view of the characteristic that human ears are sensitive to low-frequency signals but not sensitive to high-frequency signals, the speech transmitting end may perform frequency bandwidth compression on signals of a high-frequency part. For example, after a full-band signal of 48 khz (that is, the sampling rate is 48 khz, and the frequency bandwidth range is within 24 khz) is subjected to non-linear frequency bandwidth compression, all frequency bandwidth information is concentrated to a signal range of 16 khz (that is, the sampling rate is 16 khz, and the frequency bandwidth range is within 8 khz), and high-frequency signals which are higher than a sampling range of 16 khz are suppressed to zero, and then are down-sampled to a signal of 16 khz. The low-sampling rate signal obtained through non-linear frequency bandwidth compression may be coded by using a conventional speech coder of 16 khz to obtain bitstream data.

Figure 6B:
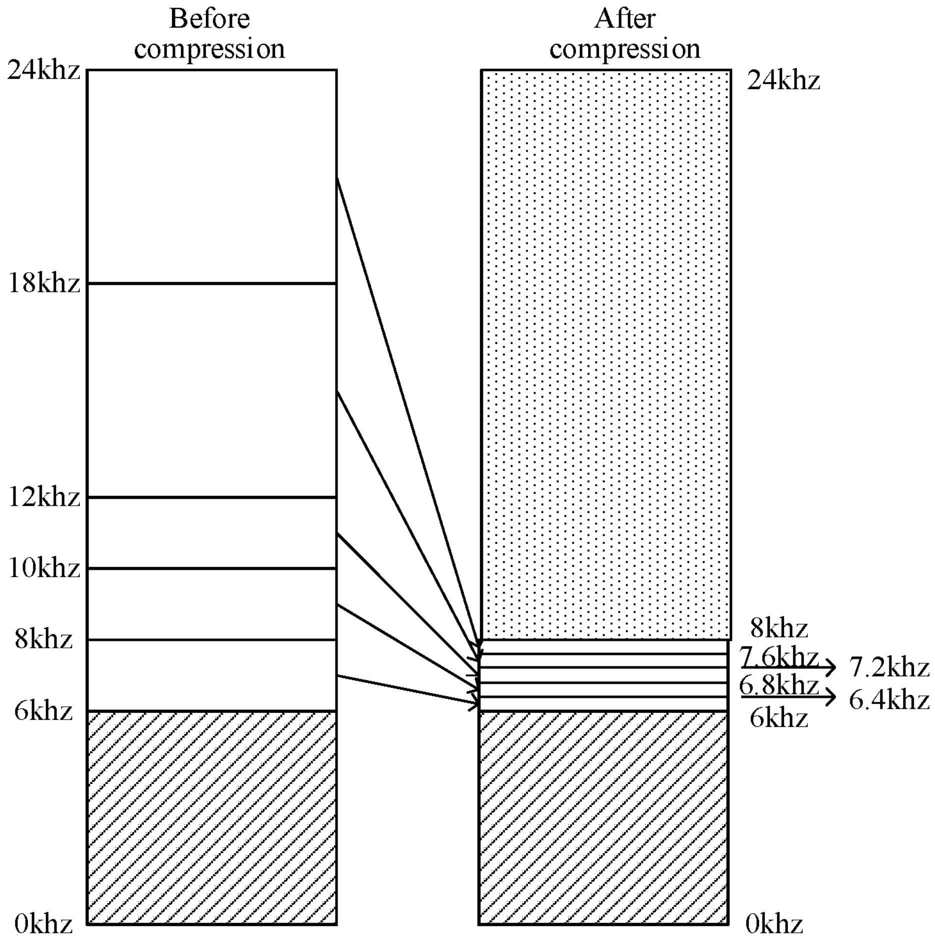
FIG. 6B is a schematic diagram of frequency domain signals before and after compression in one embodiment.

Taking a full-band signal of 48 khz as an example, the essence of the non-linear frequency bandwidth compression is that signals having a spectrum (that is, frequency spectrum) less than 6 khz are not modified, and only spectrum signals of 6-24 khz are compressed. If the full-band signal of 48 khz is compressed to a signal of 16 khz, the band mapping information may be as shown in FIG. 6B when performing frequency bandwidth compression. Before compression, the frequency bandwidth of the speech signal is 0-24 khz, the first band is 0-6 khz, and the second band is 6-24 khz. The second band may be further subdivided into a total of five sub-bands: 6-8 khz, 8-10 khz, 10-12 khz, 12-18 khz, and 18-24 khz. After compression, the frequency bandwidth of the speech signal may still be 0-24 khz, the first band is 0-6 khz, the compressed band is 6-8 khz, and the third band is 8-24 khz. The compressed band may be further subdivided into a total of five sub-bands: 6-6.4 khz, 6.4-6.8 khz, 6.8-7.2 khz, 7.2-7.6 khz, and 7.6-8 khz. 6-8 khz corresponds to 6-6.4 khz, 8-10 khz corresponds to 6.4-6.8 khz, 10-12 khz corresponds to 6.8-7.2 khz, 12-18 khz corresponds to 7.2-7.6 khz, and 18-24 khz corresponds to 7.6-8 khz.

Figure 6C:
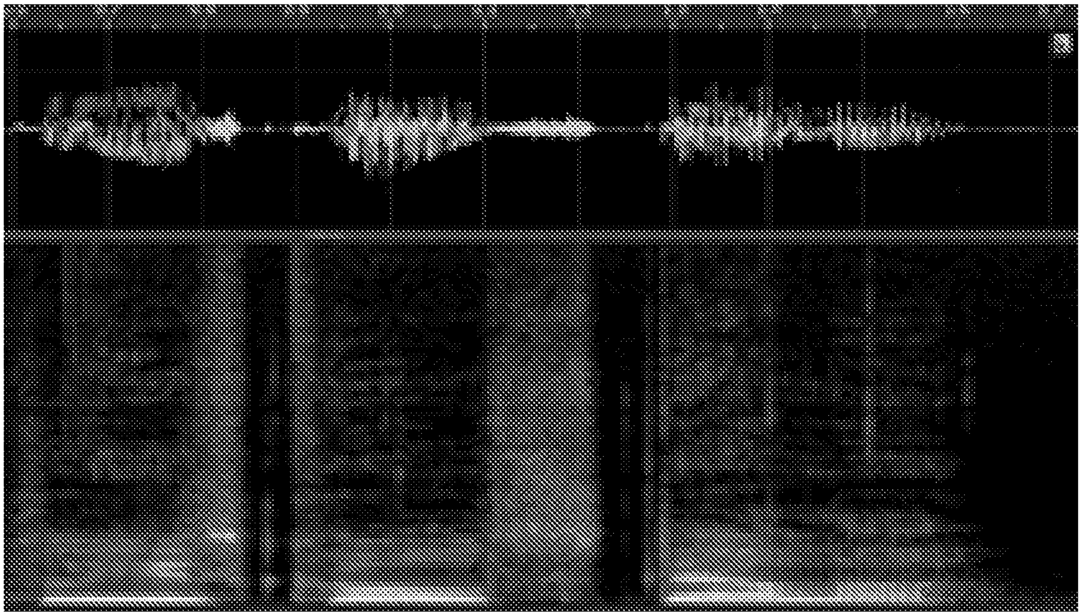
FIG. 6C is a schematic diagram of speech signals before and after compression in one embodiment.
Figure 6C:
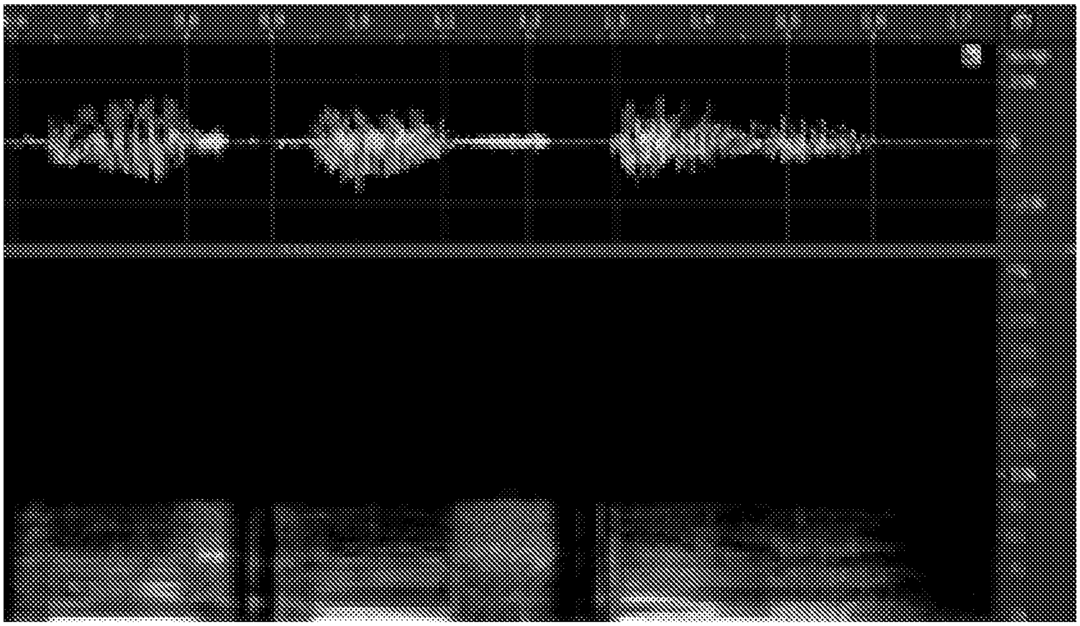

First, the amplitude and phase of each frequency point are obtained after fast Fourier transform on the high-sampling rate speech signal. The information of the first band remains unchanged. The statistical value of the amplitude of the frequency point in each sub-band on the left side of FIG. 6B is taken as the amplitude of the frequency point in the corresponding sub-band on the right side, and the phase of the frequency point in the sub-band on the right side may follow an original phase value. For example, the amplitudes of each frequency point in 6-8 khz on the left side are added and averaged to obtain a mean as the amplitude of each frequency point in 6-6.4 khz on the right side, and the phase value of each frequency point in 6-6.4 khz on the right side is the original phase value. The assignment and phase information of the frequency point in the third band is cleared. The frequency domain signal of 0-24 khz on the right side is subjected to inverse Fourier transform and down-sampling processing to obtain a compressed speech signal. Referring to FIG. 6C, (a) is a speech signal before compression, and (b) is a speech signal after compression. In FIG. 6C, the upper half is a time domain signal, and the lower half is a frequency domain signal.

It will be appreciated that although the clarity of the low-sampling rate speech signal after non-linear frequency bandwidth compression is inferior to that of the original high-sampling rate speech signal, the sound signal is naturally intelligible and does not have a perceptible noise and discomfort. Therefore, even if the speech receiving end is an existing network device, the call experience is not hindered without modification. Therefore, the method of this application has better compatibility.

Referring to FIG. 6A, after receiving bitstream data, the speech receiving end performs channel decoding and speech decoding on the bitstream data, restores a low-sampling rate speech signal into a high-sampling rate speech signal through non-linear frequency bandwidth extension processing, and finally plays the high-sampling rate speech signal.

2. Non-Linear Frequency Bandwidth Extension Processing

Figure 6D:
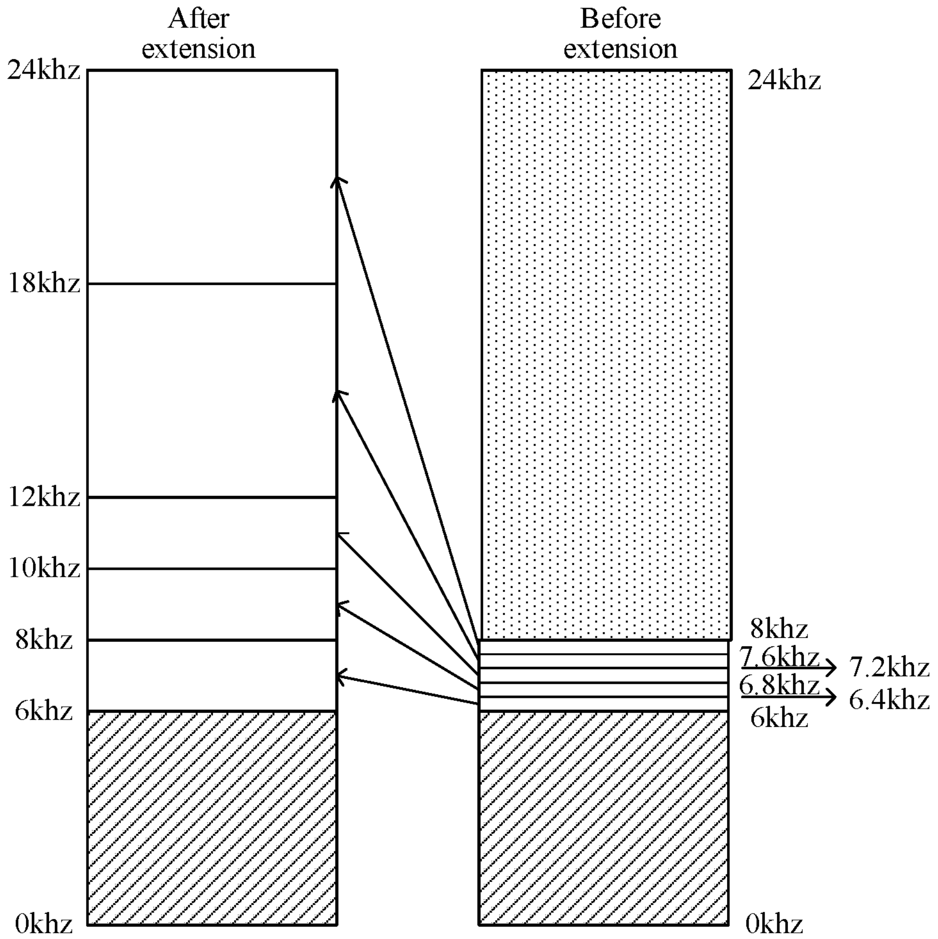
FIG. 6D is a schematic diagram of frequency domain signals before and after extension in one embodiment.
Figure 6E:
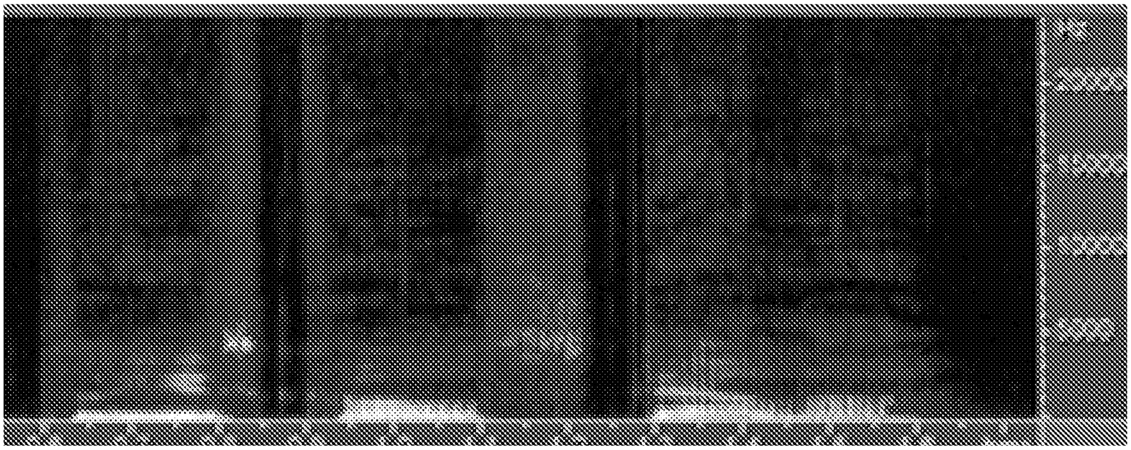
FIG. 6E is a schematic diagram of a speech signal and a target speech signal in one embodiment.
Figure 6E:
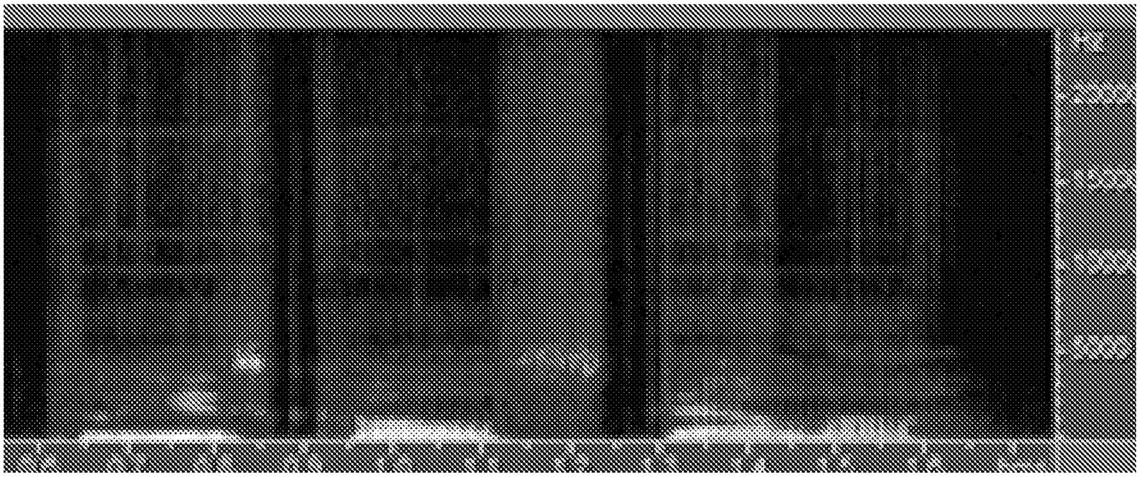

Referring to FIG. 6D, in contrast to the non-linear frequency bandwidth compression processing, the non-linear frequency bandwidth extension processing is to re-extend a compressed signal of 6-8 khz to a spectrum signal of 6-24 khz. That is, after Fourier transform, the amplitude of a frequency point in a sub-band before extension will be taken as the amplitude of a frequency point in a corresponding sub-band after extension, and the phase follows an original phase or a random disturbance value is added to a phase value of the frequency point in the sub-band before extension. A high-sampling rate speech signal may be obtained by inverse Fourier transform on the extended spectrum signal. Although it is not a perfect restoration, the subjective experience of the high-sampling rate speech signal relatively close to an original hearing is significantly improved. Referring to FIG. 6E, (a) is a frequency spectrum of an original high-sampling rate speech signal (that is, frequency spectrum information corresponding to a speech signal), and (b) is a frequency spectrum of an extended high-sampling speech signal (that is, frequency spectrum information corresponding to a target speech signal).

In this embodiment, the effect of improving the sound quality can be achieved by making a small amount of modification on the basis of the existing call system, without affecting the call cost. The original speech codec can achieve the effect of ultra-wideband codec through the speech coding method and the speech decoding method of this application, so as to achieve a call experience beyond the existing speech frequency bandwidth and effectively improve the speech clarity and intelligibility.

It will be appreciated that the speech coding method and the speech decoding method of this application may also be applied to, in addition to speech calls, content storage of speeches such as speech in a video, and scenarios relating to a speech codec application such as a speech message.

It will be appreciated that, although the various steps in the flowcharts of FIG. 2, FIG. 3 and FIG. 5 are shown in sequence as indicated by the arrows, these steps are not necessarily performed in the order indicated by the arrows. These steps are performed in no strict order unless explicitly stated herein, and these steps may be performed in other orders. Moreover, at least some of the steps in FIG. 2, FIG. 3 and FIG. 5 may include a plurality of steps or a plurality of stages. These steps or stages are not necessarily performed at the same time, but may be performed at different times. These steps or stages are not necessarily performed in sequence, but may be performed in turn or in alternation with other steps or at least some of the steps or stages in other steps.

Figure 7A:
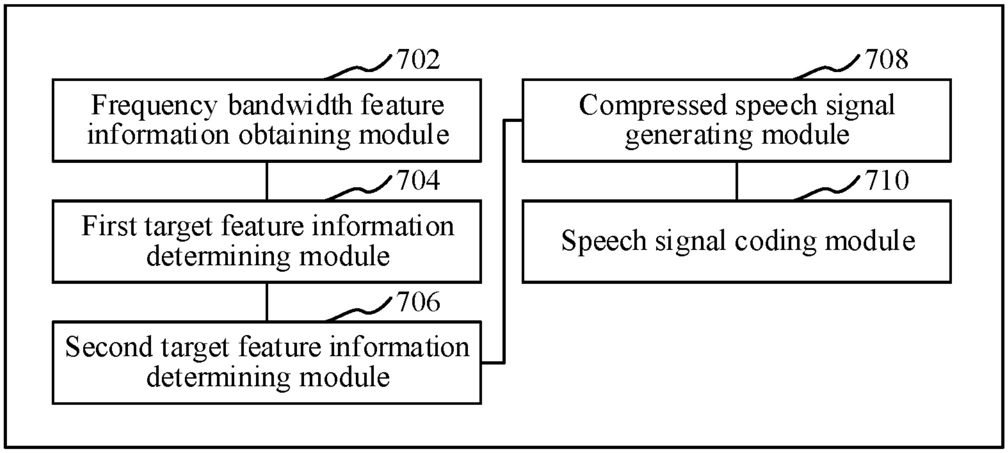
FIG. 7A is a structural block diagram of a speech coding apparatus in one embodiment.

In one embodiment, as shown in FIG. 7A, a speech coding apparatus is provided. The apparatus may use a software module or a hardware module, or the software module and the hardware module are combined to form part of a computer device. The apparatus specifically includes: a frequency bandwidth feature information obtaining module 702, a first target feature information determining module 704, a second target feature information determining module 706, a compressed speech signal generating module 708, and a speech signal coding module 710.

The frequency bandwidth feature information obtaining module 702 is configured to obtain initial frequency bandwidth feature information corresponding to a speech signal.

The first target feature information determining module 704 is configured to obtain, based on initial feature information corresponding to a first band in the initial frequency bandwidth feature information, target feature information corresponding to the first band.

The second target feature information determining module 706 is configured to perform feature compression on initial feature information corresponding to a second band in the initial frequency bandwidth feature information to obtain target feature information corresponding to a compressed band. A frequency of the first band is less than a frequency of the second band, and a frequency interval of the second band is greater than a frequency interval of the compressed band.

The compressed speech signal generating module 708 is configured to obtain, based on the target feature information corresponding to the first band and the target feature information corresponding to the compressed band, intermediate frequency bandwidth feature information, and obtain, based on the intermediate frequency bandwidth feature information, a compressed speech signal corresponding to the speech signal.

The speech signal coding module 710 is configured to code the compressed speech signal through a speech coding module to obtain coded speech data corresponding to the speech signal. A target sampling rate corresponding to the compressed speech signal is less than or equal to a supported sampling rate corresponding to the speech coding module, and the target sampling rate is less than a sampling rate corresponding to the speech signal.

In the foregoing speech coding apparatus, before speech coding, band feature information may be compressed for a speech signal having any sampling rate to reduce the sampling rate of the speech signal to a sampling rate supported by a speech coder. A target sampling rate corresponding to a compressed speech signal obtained through compression is less than the sampling rate corresponding to the speech signal. A compressed speech signal having a low sampling rate is obtained through compression. Since the sampling rate of the compressed speech signal is less than or equal to the sampling rate supported by the speech coder, the compressed speech signal may be successfully coded by the speech coder. Finally, the coded speech data obtained through coding may be transmitted to a speech receiving end.

In one embodiment, the frequency bandwidth feature information obtaining module is further configured to obtain a speech signal acquired by a speech acquisition device, and perform Fourier transform processing on the speech signal to obtain the initial frequency bandwidth feature information. The initial frequency bandwidth feature information includes initial amplitudes and initial phases corresponding to a plurality of initial speech frequency points.

In one embodiment, the second target feature information determining module includes:

- a band division unit, configured to perform band division on the second band to obtain at least two initial sub-bands arranged in sequence, and perform band division on the compressed band to obtain at least two target sub-bands arranged in sequence;
- a band association unit, configured to determine, based on a sub-band ranking of the initial sub-bands and the target sub-bands, the target sub-bands respectively corresponding to the initial sub-bands;
- an information conversion unit, configured to take initial feature information of a current initial sub-band corresponding to a current target sub-band as first intermediate feature information, obtain, from the initial frequency bandwidth feature information, initial feature information corresponding to a sub-band having consistent band information with the current target sub-band as second intermediate feature information, and obtain, based on the first intermediate feature information and the second intermediate feature information, target feature information corresponding to the current target sub-band; and
- an information determining unit, configured to obtain, based on the target feature information corresponding to each target sub-band, the target feature information corresponding to the compressed band.

In one embodiment, the first intermediate feature information and the second intermediate feature information both include initial amplitudes and initial phases corresponding to a plurality of initial speech frequency points. The information conversion unit is further configured to: obtain, based on a statistical value of the initial amplitude corresponding to each initial speech frequency point in the first intermediate feature information, a target amplitude of each target speech frequency point corresponding to the current target sub-band; obtain, based on the initial phase corresponding to each initial speech frequency point in the second intermediate feature information, a target phase of each target speech frequency point corresponding to the current target sub-band; and obtain, based on the target amplitude and the target phase of each target speech frequency point corresponding to the current target sub-band, the target feature information corresponding to the current target sub-band.

In one embodiment, the compressed speech signal generating module is further configured to: determine, based on a frequency difference between the compressed band and the second band, a third band, and set target feature information corresponding to the third band as invalid information; obtain, based on the target feature information corresponding to the first band, the target feature information corresponding to the compressed band, and the target feature information corresponding to the third band, intermediate frequency bandwidth feature information; perform inverse Fourier transform processing on the intermediate frequency bandwidth feature information to obtain an intermediate speech signal, where a sampling rate corresponding to the intermediate speech signal is consistent with the sampling rate corresponding to the speech signal; and perform, based on the supported sampling rate, down-sampling processing on the intermediate speech signal to obtain the compressed speech signal.

In one embodiment, the speech signal coding module is further configured to: perform speech coding on the compressed speech signal through the speech coding module to obtain first speech data; and perform channel coding on the first speech data to obtain the coded speech data.

Figure 7B:
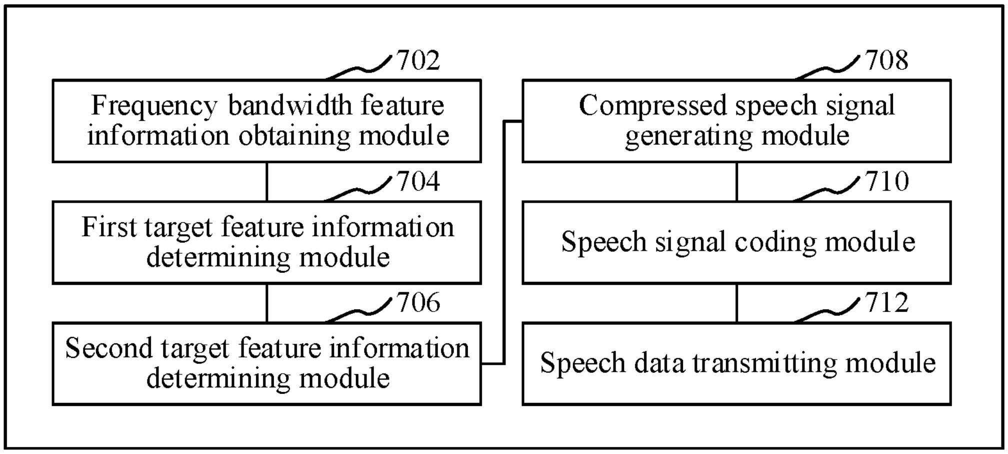
FIG. 7B is a structural block diagram of a speech coding apparatus in another embodiment.

In one embodiment, as shown in FIG. 7B, the speech coding apparatus further includes:

a speech data transmitting module 712, configured to transmit the coded speech data to a speech receiving end such that the speech receiving end performs speech restoration processing on the coded speech data to obtain a target speech signal corresponding to the speech signal, where the target speech signal is used for playing.

In one embodiment, the speech data transmitting module is further configured to: obtain, based on the second band and the compressed band, compression identification information corresponding to the speech signal; and transmit the coded speech data and the compression identification information to the speech receiving end such that the speech receiving end decodes the coded speech data to obtain a compressed speech signal, and perform, based on the compression identification information, frequency bandwidth extension on the compressed speech signal to obtain the target speech signal.

Figure 8:
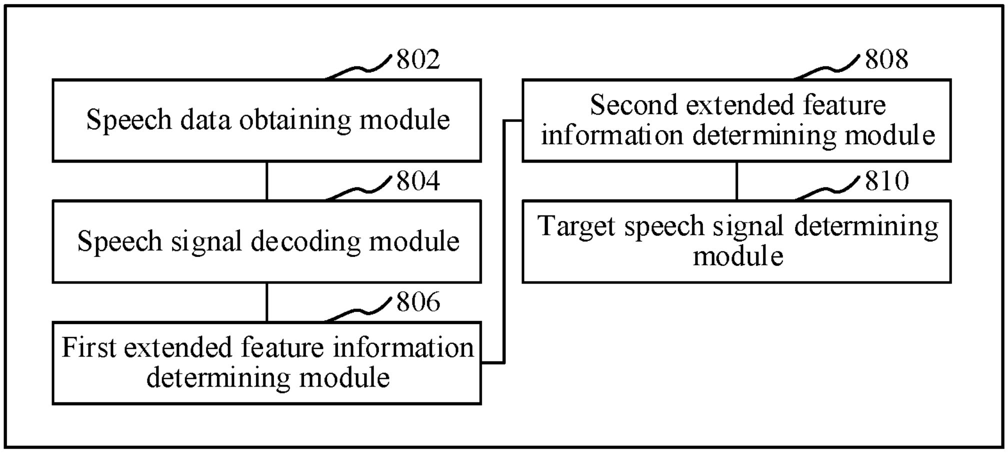
FIG. 8 is a structural block diagram of a speech decoding apparatus in one embodiment.

In one embodiment, as shown in FIG. 8, a speech decoding apparatus is provided. The apparatus may use a software module or a hardware module, or the software module and the hardware module are combined to form part of a computer device. The apparatus specifically includes: a speech data obtaining module 802, a speech signal decoding module 804, a first extended feature information determining module 806, a second extended feature information determining module 808, and a target speech signal determining module 810.

The speech data obtaining module 802 is configured to obtain coded speech data. The coded speech data is obtained by performing speech compression processing on a speech signal.

The speech signal decoding module 804 is configured to decode the coded speech data through a speech decoding module to obtain a decoded speech signal. A target sampling rate corresponding to the decoded speech signal is less than or equal to a supported sampling rate corresponding to the speech decoding module.

The first extended feature information determining module 806 is configured to generate target frequency bandwidth feature information corresponding to the decoded speech signal, and obtain, based on target feature information corresponding to a first band in the target frequency bandwidth feature information, extended feature information corresponding to the first band.

The second extended feature information determining module 808 is configured to perform feature extension on target feature information corresponding to a compressed band in the target frequency bandwidth feature information to obtain extended feature information corresponding to a second band. A frequency of the first band is less than a frequency of the compressed band, and a frequency interval of the compressed band is less than a frequency interval of the second band.

The target speech signal determining module 810 is configured to obtain, based on the extended feature information corresponding to the first band and the extended feature information corresponding to the second band, extended frequency bandwidth feature information, and obtain, based on the extended frequency bandwidth feature information, a target speech signal corresponding to the speech signal. A sampling rate of the target speech signal is greater than the target sampling rate, and the target speech signal is used for playing.

In the foregoing speech decoding apparatus, after coded speech data obtained through speech compression processing is obtained, the coded speech data may be decoded to obtain a decoded speech signal. Through the extension of band feature information, the sampling rate of the decoded speech signal may be increased to obtain a target speech signal for playing. The playing of a speech signal is not subject to the sampling rate supported by the speech decoder. During speech playing, a high-sampling rate speech signal with more abundant information may also be played.

In one embodiment, the speech signal decoding module is further configured to perform channel decoding on the coded speech data to obtain second speech data, and perform speech decoding on the second speech data through the speech decoding module to obtain the decoded speech signal.

In one embodiment, the second extended feature information determining module includes:

a mapping information obtaining unit, configured to obtain band mapping information, where the band mapping information is used for determining a mapping relationship between at least two target sub-bands corresponding to the compressed band and at least two initial sub-bands corresponding to the second band; and a feature extension unit, configured to perform, based on the band mapping information, feature extension on the target feature information corresponding to the compressed band in the target frequency bandwidth feature information to obtain the extended feature information corresponding to the second band.

In one embodiment, the coded speech data carries compression identification information. The mapping information acquisition unit is further configured to obtain, based on the compression identification information, the band mapping information.

In one embodiment, the feature extension unit is further configured to: take target feature information of a current target sub-band corresponding to a current initial sub-band as third intermediate feature information, obtain, from the target frequency bandwidth feature information, target feature information corresponding to a sub-band having consistent band information with the current initial sub-band as fourth intermediate feature information, and obtain, based on the third intermediate feature information and the fourth intermediate feature information, extended feature information corresponding to the current initial sub-band; and obtain, based on the extended feature information corresponding to each initial sub-band, the extended feature information corresponding to the second band.

In one embodiment, the third intermediate feature information and the fourth intermediate feature information both include target amplitudes and target phases corresponding to a plurality of target speech frequency points. The feature extension unit is further configured to: obtain, based on the target amplitude corresponding to each target speech frequency point in the third intermediate feature information, a reference amplitude of each initial speech frequency point corresponding to the current initial sub-band; add a random disturbance value to a phase of each initial speech frequency point corresponding to the current initial sub-band when the fourth intermediate feature information is null, to obtain a reference phase of each initial speech frequency point corresponding to the current initial sub-band; obtain, based on the target phase corresponding to each target speech frequency point in the fourth intermediate feature information, a reference phase of each initial speech frequency point corresponding to the current initial sub-band when the fourth intermediate feature information is not null; and obtain, based on the reference amplitude and the reference phase of each initial speech frequency point corresponding to the current initial sub-band, the extended feature information corresponding to the current initial sub-band.

For specific limitations on the speech coding apparatus and the speech decoding apparatus, reference may be made to the foregoing limitations on the speech coding method and the speech decoding method. Details will be omitted herein. The various modules in the speech coding apparatus and the speech decoding apparatus may be implemented in whole or in part by software, hardware, and combinations thereof. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a terminal, and an internal structure diagram thereof may be shown in FIG. 9. The computer device includes a processor, a memory, a communication interface, a display screen, and an input apparatus, which are connected by a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured for wired or wireless communication with an external terminal. The wireless communication may be realized through WI-FI, operator networks, near-field communication (NFC), or other technologies. The computer-readable instructions, when executed by one or more processors, implement a speech decoding method. The computer-readable instructions, when executed by one or more processors, implement a speech coding method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

In one embodiment, a computer device is provided. The computer device may be a server, and an internal structure diagram thereof may be shown in FIG. 10. The computer device includes a processor, a memory, and a network interface, which are connected by a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store coded speech data, band mapping information, and the like. The network interface of the computer device is configured to communicate with an external terminal through a network connection. The computer-readable instructions, when executed by one or more processors, implement a speech coding method. The computer-readable instructions, when executed by one or more processors, implement a speech decoding method.

Figure 9:
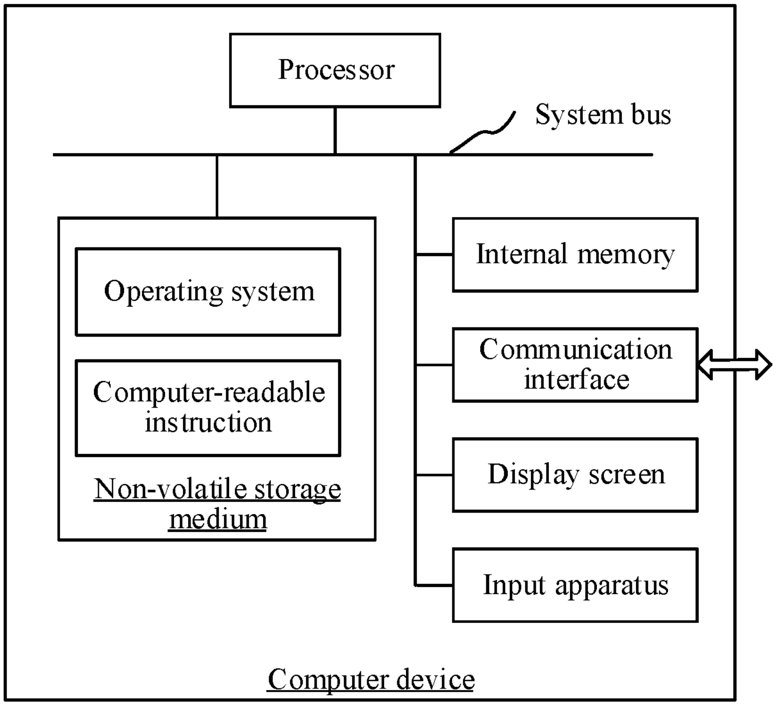
FIG. 9 is an internal structure diagram of a computer device in one embodiment.
Figure 10:
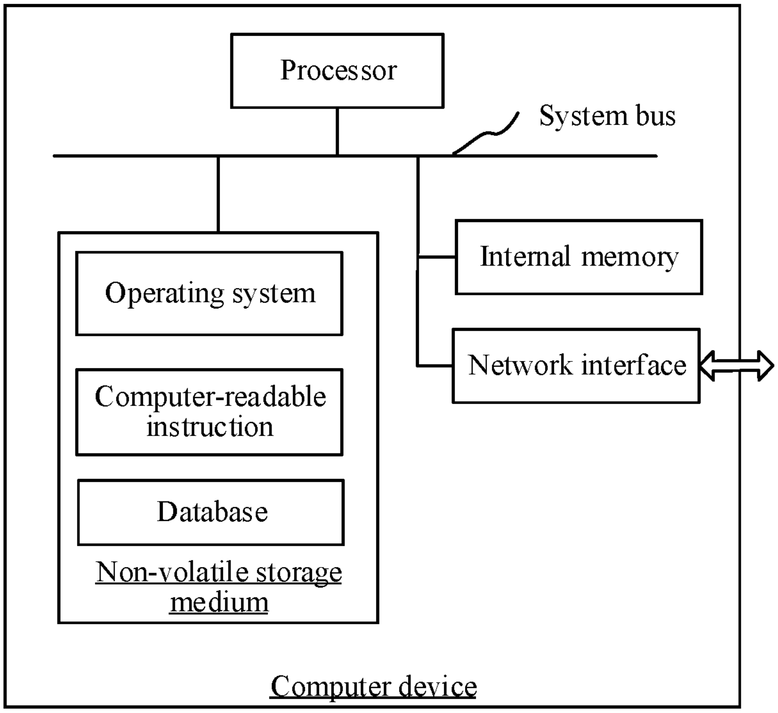
FIG. 10 is an internal structure diagram of a computer device in one embodiment.

It will be appreciated by a person skilled in the art that the structures shown in FIG. 9 and FIG. 10 are merely block diagrams of some of the structures relevant to the solution of this application and do not constitute a limitation of the computer device to which the solution of this application is applied. The specific computer device may include more or fewer components than those shown in the figures, or include some components combined, or have different component arrangements.

In one embodiment, a computer device is further provided. The computer device includes a memory and one or more processors. The memory stores computer-readable instructions. The one or more processors, when executing the computer-readable instructions, implement the steps in the foregoing method embodiments.

In one embodiment, a computer-readable storage medium is provided. The computer-readable storage medium stores computer-readable instructions. The computer-readable instructions, when executed by one or more processors, implement the steps in the foregoing method embodiments.

In one embodiment, a computer program product or a computer program is provided. The computer program product or the computer program includes computer-readable instructions. The computer-readable instructions are stored in a computer-readable storage medium. One or more processors of a computer device read the computer-readable instructions from the computer-readable storage medium. The one or more processors execute the computer-readable instructions to enable the computer device to perform the steps in the foregoing method embodiments.

It will be appreciated by a person of ordinary skill in the art that implementing all or part of the processes in the foregoing method embodiments may be accomplished by instructing associated hardware through computer-readable instructions. The computer-readable instructions may be stored on a non-volatile computer-readable storage medium. The computer-readable instructions, when executed, may include the processes in the foregoing method embodiments. Any reference to a memory, storage, a database, or another medium used in the various embodiments provided by this application may include at least one of non-volatile and volatile memories. The non-volatile memory may include a read-only memory (ROM), a magnetic tape, a floppy disk, a flash memory, an optical memory, and the like. The volatile memory may include a random-access memory (RAM) or an external cache. For the purpose of description instead of limitation, the RAM is available in a plurality of forms, such as a static random-access memory (SRAM) or a dynamic random access memory (DRAM).

The technical features of the foregoing embodiments may be combined in any combination. In order to make the description concise, not all the possible combinations of the technical features in the foregoing embodiments are described. However, as long as there is no contradiction between the combinations of these technical features, the combinations are to be considered within the scope of this specification.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing embodiments only describe several implementations of this application, which are described specifically and in detail, but cannot be construed as a limitation to the patent scope of this application. It will be appreciated by a person of ordinary skill in the art that several transformations and improvements may be made without departing from the concept of this application. These transformations and improvements belong to the protection scope of this application. Therefore, the protection scope of the patent of this application shall be subject to the appended claims.

What is claimed is:

1. A speech coding method performed by a computer device, the method comprising:

obtaining initial frequency bandwidth feature information corresponding to a speech signal;

obtaining, from the initial frequency bandwidth feature information, target feature information corresponding to a first band and a second band, respectively, wherein a frequency of the first band is less than a frequency of the second band;

performing feature compression on the target feature information corresponding to the second band in the initial frequency bandwidth feature information to obtain target feature information corresponding to a compressed band based on a non-linear band mapping relationship between the second band and the compressed band, a frequency interval of the second band being greater than a frequency interval of the compressed band;

obtaining, based on the target feature information corresponding to the first band and the target feature information corresponding to the compressed band, a compressed speech signal corresponding to the speech signal, further including:

determining, based on a frequency difference between the compressed band and the second band, a third band, and setting target feature information corresponding to the third band to be zero;

obtaining, based on the target feature information corresponding to the first band, the target feature information corresponding to the compressed band, and the target feature information corresponding to the third band, intermediate frequency bandwidth feature information;

performing inverse Fourier transform processing on the intermediate frequency bandwidth feature information to obtain an intermediate speech signal, wherein a sampling rate of the intermediate speech signal is the same with a sampling rate of the speech signal; and performing down-sampling on the intermediate speech signal to obtain the compressed speech signal based on a target sampling rate corresponding to the compressed speech signal, wherein the target sampling rate is less than the sampling rate corresponding to the speech signal; and coding the compressed speech signal to obtain coded speech data corresponding to the speech signal.

2. The method according to claim 1, wherein the obtaining initial frequency bandwidth feature information corresponding to a speech signal comprises:

obtaining a speech signal acquired by a speech acquisition device; and performing Fourier transform processing on the speech signal to obtain the initial frequency bandwidth feature information, the initial frequency bandwidth feature information comprising initial amplitudes and initial phases corresponding to a plurality of initial speech frequency points.

3. The method according to claim 1, wherein the performing feature compression on initial feature information corresponding to the second band in the initial frequency bandwidth feature information to obtain the target feature information corresponding to a compressed band comprises:

performing band division on the second band to obtain at least two initial sub-bands arranged in sequence;

performing band division on the compressed band to obtain at least two target sub-bands arranged in sequence;

determining, based on a sub-band ranking of the initial sub-bands and the target sub-bands, the target sub-bands respectively corresponding to the initial sub-bands;

taking initial feature information of a current initial sub-band corresponding to a current target sub-band as first intermediate feature information, obtaining, from the initial frequency bandwidth feature information, initial feature information corresponding to a sub-band having consistent band information with the current target sub-band as second intermediate feature information, and obtaining, based on the first intermediate feature information and the second intermediate feature information, target feature information corresponding to the current target sub-band; and obtaining, based on the target feature information corresponding to each target sub-band, the target feature information corresponding to the compressed band.

4. The method according to claim 3, wherein the first intermediate feature information and the second intermediate feature information both comprise the initial amplitudes and the initial phases corresponding to a plurality of initial speech frequency points;

the obtaining, based on the first intermediate feature information and the second intermediate feature information, the target feature information corresponding to the current target sub-band comprises:

obtaining, based on a statistical value of the initial amplitude corresponding to each initial speech frequency point in the first intermediate feature information, a target amplitude of each target speech frequency point corresponding to the current target sub-band;

obtaining, based on the initial phase corresponding to each initial speech frequency point in the second intermediate feature information, a target phase of each target speech frequency point corresponding to the current target sub-band; and obtaining, based on the target amplitude and the target phase of each target speech frequency point corresponding to the current target sub-band, the target feature information corresponding to the current target sub-band.

5. The method according to claim 1, wherein the coding the compressed speech signal to obtain the coded speech data corresponding to the speech signal comprises:

performing speech coding on the compressed speech signal to obtain first speech data; and performing channel coding on the first speech data to obtain the coded speech data.

6. The method according to claim 1, further comprising:

transmitting the coded speech data to a speech receiving end such that the speech receiving end performs speech restoration processing on the coded speech data to obtain a target speech signal corresponding to the speech signal, the target speech signal being used for playing.

7. The method according to claim 6, wherein the transmitting the coded speech data to a speech receiving end such that the speech receiving end performs speech restoration processing on the coded speech data to obtain the target speech signal corresponding to the speech signal comprises:

obtaining, based on the second band and the compressed band, compression identification information corresponding to the speech signal; and transmitting the coded speech data and the compression identification information to the speech receiving end such that the speech receiving end decodes the coded speech data to obtain the compressed speech signal, and performing, based on the compression identification information, frequency bandwidth extension on the compressed speech signal to obtain the target speech signal.

8. A computer device, comprising a memory and one or more processors, the memory storing computer-readable instructions, the one or more processors, when executing the computer-readable instructions, causing the computer device to perform a speech coding method including:

obtaining initial frequency bandwidth feature information corresponding to a speech signal;

obtaining, from the initial frequency bandwidth feature information, target feature information corresponding to a first band and a second band, respectively, wherein a frequency of the first band is less than a frequency of the second band;

performing feature compression on the target feature information corresponding to the second band in the initial frequency bandwidth feature information to obtain target feature information corresponding to a compressed band based on a non-linear band mapping relationship between the second band and the compressed band, a frequency interval of the second band being greater than a frequency interval of the compressed band;

obtaining, based on the target feature information corresponding to the first band and the target feature information corresponding to the compressed band, a compressed speech signal corresponding to the speech signal, further including:

determining, based on a frequency difference between the compressed band and the second band, a third band, and setting target feature information corresponding to the third band to be zero;

obtaining, based on the target feature information corresponding to the first band, the target feature information corresponding to the compressed band, and the target feature information corresponding to the third band, intermediate frequency bandwidth feature information;

performing inverse Fourier transform processing on the intermediate frequency bandwidth feature information to obtain an intermediate speech signal, wherein a sampling rate of the intermediate speech signal is the same with a sampling rate of the speech signal; and performing down-sampling on the intermediate speech signal to obtain the compressed speech signal based on a target sampling rate corresponding to the compressed speech signal, wherein the target sampling rate is less than the sampling rate corresponding to the speech signal; and coding the compressed speech signal to obtain coded speech data corresponding to the speech signal.

9. The computer device according to claim 8, wherein the obtaining initial frequency bandwidth feature information corresponding to a speech signal comprises:

obtaining a speech signal acquired by a speech acquisition device; and performing Fourier transform processing on the speech signal to obtain the initial frequency bandwidth feature information, the initial frequency bandwidth feature information comprising initial amplitudes and initial phases corresponding to a plurality of initial speech frequency points.

10. The computer device according to claim 8, wherein the performing feature compression on initial feature information corresponding to the second band in the initial frequency bandwidth feature information to obtain the target feature information corresponding to a compressed band comprises:

performing band division on the second band to obtain at least two initial sub-bands arranged in sequence;

performing band division on the compressed band to obtain at least two target sub-bands arranged in sequence;

determining, based on a sub-band ranking of the initial sub-bands and the target sub-bands, the target sub-bands respectively corresponding to the initial sub-bands;

taking initial feature information of a current initial sub-band corresponding to a current target sub-band as first intermediate feature information, obtaining, from the initial frequency bandwidth feature information, initial feature information corresponding to a sub-band having consistent band information with the current target sub-band as second intermediate feature information, and obtaining, based on the first intermediate feature information and the second intermediate feature information, target feature information corresponding to the current target sub-band; and obtaining, based on the target feature information corresponding to each target sub-band, the target feature information corresponding to the compressed band.

11. The computer device according to claim 10, wherein the first intermediate feature information and the second intermediate feature information both comprise the initial amplitudes and the initial phases corresponding to a plurality of initial speech frequency points;

the obtaining, based on the first intermediate feature information and the second intermediate feature information, the target feature information corresponding to the current target sub-band comprises:

obtaining, based on a statistical value of the initial amplitude corresponding to each initial speech frequency point in the first intermediate feature information, a target amplitude of each target speech frequency point corresponding to the current target sub-band;

obtaining, based on the initial phase corresponding to each initial speech frequency point in the second intermediate feature information, a target phase of each target speech frequency point corresponding to the current target sub-band; and obtaining, based on the target amplitude and the target phase of each target speech frequency point corresponding to the current target sub-band, the target feature information corresponding to the current target sub-band.

12. The computer device according to claim 8, wherein the coding the compressed speech signal to obtain the coded speech data corresponding to the speech signal comprises:

performing speech coding on the compressed speech signal to obtain first speech data; and performing channel coding on the first speech data to obtain the coded speech data.

13. The computer device according to claim 8, wherein the method further comprises:

transmitting the coded speech data to a speech receiving end such that the speech receiving end performs speech restoration processing on the coded speech data to obtain the target speech signal corresponding to the speech signal, the target speech signal being used for playing.

14. A non-transitory computer-readable storage medium, storing computer-readable instructions, the computer-readable instructions, when executed by one or more processors of a computer device, causing the computer device to perform a speech coding method including:

obtaining initial frequency bandwidth feature information corresponding to a speech signal;

obtaining, from the initial frequency bandwidth feature information, target feature information corresponding to a first band and a second band, respectively, wherein a frequency of the first band is less than a frequency of the second band;

performing feature compression on the target feature information corresponding to the second band in the initial frequency bandwidth feature information to obtain target feature information corresponding to a compressed band based on a non-linear band mapping relationship between the second band and the compressed band, a frequency interval of the second band being greater than a frequency interval of the compressed band;

obtaining, based on the target feature information corresponding to the first band and the target feature information corresponding to the compressed band, a compressed speech signal corresponding to the speech signal, further including:

determining, based on a frequency difference between the compressed band and the second band, a third band, and setting target feature information corresponding to the third band to be zero;

obtaining, based on the target feature information corresponding to the first band, the target feature information corresponding to the compressed band, and the target feature information corresponding to the third band, intermediate frequency bandwidth feature information;

performing inverse Fourier transform processing on the intermediate frequency bandwidth feature information to obtain an intermediate speech signal, wherein a sampling rate of the intermediate speech signal is the same with a sampling rate of the speech signal; and performing down-sampling on the intermediate speech signal to obtain the compressed speech signal based on a target sampling rate corresponding to the compressed speech signal, wherein the target sampling rate is less than the sampling rate corresponding to the speech signal; and coding the compressed speech signal to obtain coded speech data corresponding to the speech signal.

15. The non-transitory computer-readable storage medium according to claim 14, wherein the obtaining initial frequency bandwidth feature information corresponding to a speech signal comprises:

obtaining a speech signal acquired by a speech acquisition device; and performing Fourier transform processing on the speech signal to obtain the initial frequency bandwidth feature information, the initial frequency bandwidth feature information comprising initial amplitudes and initial phases corresponding to a plurality of initial speech frequency points.

16. The non-transitory computer-readable storage medium according to claim 14, wherein the performing feature compression on initial feature information corresponding to the second band in the initial frequency bandwidth feature information to obtain the target feature information corresponding to a compressed band comprises:

performing band division on the second band to obtain at least two initial sub-bands arranged in sequence;

performing band division on the compressed band to obtain at least two target sub-bands arranged in sequence;

determining, based on a sub-band ranking of the initial sub-bands and the target sub-bands, the target sub-bands respectively corresponding to the initial sub-bands;

taking initial feature information of a current initial sub-band corresponding to a current target sub-band as first intermediate feature information, obtaining, from the initial frequency bandwidth feature information, initial feature information corresponding to a sub-band having consistent band information with the current target sub-band as second intermediate feature information, and obtaining, based on the first intermediate feature information and the second intermediate feature information, target feature information corresponding to the current target sub-band; and obtaining, based on the target feature information corresponding to each target sub-band, the target feature information corresponding to the compressed band.

17. The non-transitory computer-readable storage medium according to claim 14, wherein the coding the compressed speech signal to obtain the coded speech data corresponding to the speech signal comprises:

performing speech coding on the compressed speech signal to obtain first speech data; and performing channel coding on the first speech data to obtain the coded speech data.

* * * * *